United States Patent
Tsukigi et al.

(10) Patent No.: US 7,244,917 B2
(45) Date of Patent: Jul. 17, 2007

(54) PHOTOELECTRIC SWITCH

(75) Inventors: Shinichi Tsukigi, Osaka (JP);
Katsunari Koyama, Osaka (JP)

(73) Assignee: Keyence Corporation, Osaka (JP)

( * ) Notice: Subject to any disclaimer, the term of this patent is extended or adjusted under 35 U.S.C. 154(b) by 1 day.

(21) Appl. No.: 11/362,355

(22) Filed: Feb. 24, 2006

(65) Prior Publication Data
US 2006/0192089 A1    Aug. 31, 2006

(30) Foreign Application Priority Data
Feb. 25, 2005    (JP)    ............ P 2005-051452

(51) Int. Cl.
*G01J 1/32*    (2006.01)
(52) U.S. Cl. ................................. 250/205
(58) Field of Classification Search ........... 250/205, 250/221
See application file for complete search history.

(56) References Cited

U.S. PATENT DOCUMENTS 7,002,128 B2 *  2/2006  Hedin et al. ............ 250/205
7,098,441 B2 *  8/2006  Yamaguchi et al. ...... 250/221
2003/0136895 A1 *  7/2003  Ogawa .................... 250/205

FOREIGN PATENT DOCUMENTS

JP    A-2003-086830    3/2003

\* cited by examiner

*Primary Examiner*—Thanh X. Luu
*Assistant Examiner*—Suezu Ellis
(74) *Attorney, Agent, or Firm*—Kilyk & Bowersox, P.L.L.C.

(57) ABSTRACT

A projection head of a photoelectric sensor includes a first monitoring light receiving device for receiving a part of a light that the light projecting device emits, and a projected light quantity controlling device for executing a control such that a first monitor signal obtained by the first monitoring light receiving device is kept constant to maintain a quantity of projected light of the light projecting device at a predetermined value. Also, a controlling portion of a controller senses an abnormality of the projection head based on a monitor signal obtained from the first monitoring light receiving device to be monitored via the head cable, and suppress a light projected from the light projecting device. The separate type photoelectric switch, in which the projection head is separated from the controller, is constructed such that the abnormality of the projection head can be monitored on the controller side.

19 Claims, 19 Drawing Sheets

PHOTOELECTRIC SWITCH

The present application claims foreign priority based on Japanese Patent Application No. 2005-051452, filed Feb. 25, 2005, the content of which is incorporated herein by reference.

BACKGROUND OF THE INVENTION

1. Technical Field

The present invention relates to a photoelectric switch capable of receiving a light emitted from a light projecting device via a light receiving device and executing a sensing operation by comparing information sensed from a quantity of received light with a threshold value.

2. Related Art

The photoelectric switch is a sensor that is able to sense a sensed target in a noncontact manner, and is utilized to sense whether or not the moving target is present on a production line in a factory, and the like. Normally the presence/absence of the target is decided by projecting a light onto a carrying route of the target and then sensing a reflected light or a transmitted light of the light. The transmission photoelectric switch utilizes that a quantity of received light of the light receiving portion is changed because a light projected from the light projecting portion is intercepted by the object that passes through an object sensing area, and can decide the presence of the target based on this change. The transmission photoelectric switch includes the projection head having the light projecting device such as LED (light emitting diode), or the like, and the reception head having the light receiving device such as PD (photodiode), or the like. The projection head and the reception head are arranged to oppose to each other, and a photoelectric sensor is formed between the projection head and the reception head.

As the type of the photoelectric switch, there are the transmission type, the diffuse reflection type, and the coaxial regression reflection type. In the transmission type out of them, the projection head and the reception head are constructed as a separate body. While, in the coaxial regression reflection type and the diffuse reflection type photoelectric switches, the projection head and the reception head are constructed integrally. The integral type possesses such an advantage that laying of the wiring is simplified rather than the separate type and the coaxial regression reflection type possesses such an advantage that a sensed distance becomes longer than the diffuse reflection type because the sensor and the reflector plate are arranged to oppose to each other and put the sensed object between them.

Also, as the light projecting device used in the projection head of the photoelectric switch, the devices employing LD (semiconductor laser) instead of LED have been developed. The LD is superior in optical characteristics to the LED, and thus a light source of the photoelectric sensor using the LD is smaller than the LED. Therefore, the spot can be narrowed, visibility of the spot can be improved, and workability in the fitting operation can be improved. Also, since a light quantity density is high, a large quantity of light can be obtained by the small spot. As a result, such advantages can be achieved that the sensing performance can be improved, and the like.

Meanwhile, the safety measures are required of the products handling the laser beam in response to the output beam according to various standards. For example, in "Radiation Safety Measure of the Laser Product" stipulated in JIS (Japan Industrial Standard), the safety measures are classified in response to the output of the laser beam of the laser product and the necessary safety measure is stipulated every class. In this manner, in the photoelectric sensor using the LD, the user must check according to standards of the safety whether or not a power of the laser beam projected as the sensing light is suppressed lower than a specified value in response to the country or the district, the service, and the class. Also, a quantity of emitted light of the laser must be suppressed lower than a predetermined level when a single failure occurs in the circuit. As the measure for this purpose, it may be considered that a coupling efficiency of the optical system should be decreased to in precaution against the case of failure such that, even when the laser output is increased to its maximum, a quantity of light emitted to the outside of the photoelectric sensor is lower than a specified value in Class 1. However, according to this method, few problems arise in the transmission photoelectric sensor when a quantity of emitted light is set in view of the lifetime of LD, nevertheless a quantity of projected light is small in the diffuse reflection type and the performance is extremely deteriorated.

Therefore, in the photoelectric sensor using the LD in the prior art, a protecting circuit for monitoring and limiting a quantity of light of the LD is provided on the projection head side. A configurative example of the photoelectric sensor having the protecting circuit is shown in a block diagram of FIG. 22. The photoelectric sensor shown in FIG. 22 is the separate type photoelectric sensor in which a controller 200D and a projection head 400D are constructed separately. The projection head 400D includes an LD as the light projecting device, an LD driving circuit 960, a power controlling circuit 956, and a monitor signal generating circuit 962. The LD driving circuit 960 drives the LD by connecting the LD and a monitor PD as the PD monitoring light receiving device. The power controlling circuit 956 supplies a power to the LD driving circuit 960. The monitor signal generating circuit 962 senses/amplifies a monitor current of the monitoring light receiving device. In the controller 200D, an LD timing controlling circuit 958 for sending out a lighting timing to pulse-drive the LD. Normally the LD has the monitoring light receiving device such as the monitor PD, or the like in the module, and thus a quantity of emitted light of the LD can be sensed by sensing a quantity of light of the monitoring light receiving device. Therefore, a feedback control is executed such that the LD can maintain a predetermined output by amplifying a quantity of emitted light and adjusting a gain by means of an APC circuit 955, and the like.

(Protecting Circuit)

In addition, the projection head 400D includes a monitor signal level deciding circuit 964, a monitor signal generating circuit failure deciding circuit 966, a DC lighting preventing circuit 970, and the like, as the protecting circuit. The monitor signal level deciding circuit 964 decides whether or not a monitor signal obtained by the monitor signal generating circuit 962 reaches a predetermined level (threshold value) and instructs the power controlling circuit 956 to control a power or cut off a power when the monitor signal reached the predetermined value. The monitor signal generating circuit failure deciding circuit 966 senses the failure of the monitor signal generating circuit 962. The DC lighting preventing circuit 970 monitors whether or not the pulse lighting of the light projecting device is switched into the DC lighting. An example of such protecting circuit is shown in a circuit diagram of FIG. 23. The projection head 400D shown in FIG. 23 includes an APC circuit block 955B, a monitor signal level deciding circuit block 964B, a monitor signal generating circuit failure deciding circuit block 966B, and a DC lighting preventing circuit block 970B.

(APC Circuit Block 955B)

The APC circuit block 955B turns ON/OFF an LD module 968, in which the LD as the light projecting device and the monitor PD as the LD monitoring light receiving device are built, the pulse signal. More concretely, an amplifier AMP1 turns ON/OFF a transistor Q2. A signal obtained by voltage-dividing a pulse signal fed from a pulse signal input terminal by a resistor R1 and a variable resistor (trimmer) R2 is input into the (+) side of the amplifier AMP1. Also, the (−) side of the amplifier AMP1 is connected to an output of the amplifier AMP1 via a capacitor C5 and connected to the output signal side of the monitor PD to feed back, and is grounded via a resistor R5. The output signal side of the amplifier AMP1 is connected to a base of the transistor Q2. Also, the emitter side of the transistor Q2 is connected to an anode of the LD via a protection resistor R4. Thus, when the pulse signal is input, the transistor Q2 is turned ON to drive the LD. A drive voltage terminal $V_{cc}$ is connected to the collector side of the transistor Q2 via a transistor Q1. Transistors Q3, Q4, Q5 are connected to a base of the transistor Q1 via a resistor R3. All transistors Q1, Q3, Q4, Q5 are turned ON in the normal operation. In order to turn OFF the LD when the abnormality such as the failure occurs, a current supply to the LD is interrupted by turning OFF the transistor Q1. In order to turn OFF the transistor Q1, a base side voltage Vb of the PNP bipolar transistor Q1 is set higher than an emitter side voltage Ve by −0.6 V or more.

(DC Lighting Preventing Circuit Block 970b)

An emitter of the PNP transistor Q3 is connected to a base side of the transistor Q1 via the resistor R3 and a grounded capacitor C1 to constitute the DC lighting preventing circuit 970. The pulse signal input terminal is connected to a base side of the transistor Q3. When the pulse signal is kept at HIGH due to any abnormality, the LD is shifted from the pulse lighting to the DC lighting. In this case, the transistor Q3 is turned OFF, then the capacitor C1 is charged in the direction from the emitter of the transistor Q1 to the base via the resistor R3, and then the base side voltage Vb of the transistor Q1 becomes higher than the emitter side voltage Ve by −0.6 V or more. As a result, the transistor Q1 is turned OFF to interrupt a $V_{cc}$ supply to the LD and thus the output of the LD is stopped.

(Monitor Signal Level Deciding Circuit Block 964b)

While, the monitor signal level deciding circuit block 964B is connected to the side on which the resistor R5 is connected to the anode of the monitor PD. In this monitor signal level deciding circuit block 964B, the resistor R5 is connected to the (−) side of a comparator CMP1. The (+) side of the comparator CMP1 is voltage-divided by a resistor R6 and a trimmer R7, and grounded via a capacitor C2. The output side of the comparator CMP1 is connected to a base of the transistor Q4. The trimmer R7 is adjusted such that the output of the comparator CMP1 is turned ON in the normal operation. This monitor signal level deciding circuit block 964B corresponds to the single failure of members except the resistor R5. The monitor PD of the LD generates a monitor current linearly in answer to the optical output of the LD. The monitor current generates a monitor voltage across the resistor R5 as a voltage drop. When this monitor voltage exceeds a predetermined value defined by a voltage division between resistors R6 and R7, the output of the comparator CMP1 is turned OFF to turn OFF the transistor Q4. The charge of the capacitor C1 is not pulled out as above when the transistor Q4 is turned OFF, so that the transistor Q1 is turned OFF to interrupt the supply of $V_{cc}$ and thus the output of the LD is forcedly turned OFF.

(Monitor Signal Generating Circuit Failure Deciding Circuit Block 966B)

Further, the output side of the amplifier AMP1 in the APC circuit block 955B is connected to the (−) side of a comparator CMP2 constituting the monitor signal generating circuit failure deciding circuit block 966B to respond to the failure of the resistor R5. The (+) side of the comparator CMP2 is voltage-divided by resistors R8, R9 and is grounded via a capacitor C3. Also, an output of the comparator CMP2 is connected to a base of the transistor Q5. Accordingly, even when the monitor signal level deciding circuit 964 does not function because of the short-circuit failure of the resistor R5, the output of the amplifier AMP1 is monitored by the comparator CMP2, so that the transistor Q5 is turned OFF to interrupt a current supply to the transistor Q2 and thus the output of the LD can be stopped. That is, when the resistor R5 is broken down by the short-circuit, the monitor voltage of the APC circuit block 955B is still kept at 0 V and therefore the output of amplifier AMP1 generated based on the monitor voltage goes to the maximum voltage. The comparator CMP2 senses that the output of amplifier AMP1 had the maximum voltage, and turns OFF the transistor Q5. The charge of the capacitor C1 is not pulled out as above when the transistor Q5 is turned OFF, so that the transistor Q1 is turned OFF and thus the output of the LD is forcedly turned OFF.

In this case, the output sides of the comparators CMP1, CMP2 are connected to a resistor R11 and a capacitor C6 and a resistor R12 and a capacitor C7 respectively. Thus, the OFF state is maintained while the voltage value generated at a time of abnormality is held by the capacitors for a predetermined time.

As described above, in the photoelectric sensor using the LD in the prior art, since the control required to fulfill the safety standard is executed on the projection head side, various protecting circuits must be provided to the projection head. As a result, there were problems such that the number of articles is increased, a circuit configuration becomes complicated, and a size of the projection head is increased. Therefore, the photoelectric sensor in the prior art did not meet the demand for a further size reduction of the recent photoelectric sensor (JP-A-2003-086830, for example).

SUMMARY OF THE INVENTION

The present invention has been made to solve such problem. It is a main object of the present invention to provide a photoelectric sensor, capable of realizing a size reduction while taking safety measures for a photoelectric sensor using a laser to fulfill safety standards.

However, the present invention need not achieve the above objects, and other objects not described herein may also be achieved. Further, the invention may achieve no disclosed objects without affecting the scope of the invention.

In order to attain the above object, a first photoelectric switch of the present invention, includes a projection head having a light projecting device for projecting a sensed light to a sensing area; a controller having a controlling portion provided separately from the projection head, for controlling a light projected from the light projecting device and executing a sensing operation based on sensing information of a light receiving device that receives a light from the sensing area of the light projecting device; and a head cable for connecting electrically the projection head and the controller; wherein the projection head includes a first monitoring light receiving device for receiving a part of a light that the light projecting device emits, and a projected light quantity controlling device for executing a control such that a first monitor signal obtained by the first monitoring light receiving device is kept constant to maintain a quantity of projected light of the light projecting device at a predetermined value, and the controlling portion of the controller senses an abnormality of the projection head based on a monitor signal obtained from the first monitoring light receiving device to be monitored via the head cable, and suppress a light projected from the light projecting device. According to this configuration, the separate type photoelectric switch, in which the projection head is separated from the controller, is constructed such that the abnormality of the projection head can be monitored on the controller side. Therefore, the number of members provided to the projection head side can be reduced, and a size reduction of the head can be achieved while maintaining the safety.

Also, in the second photoelectric switch of the present invention, the projection head further includes a light projecting device driving circuit for driving the light projecting device, the first monitoring light receiving device, and the projected light quantity controlling device, and a monitor signal generating circuit for generating a monitor signal based on a signal that is sensed by the first monitoring light receiving device, and the controller further includes a monitor signal sensing circuit for sensing the monitor signal generated by the monitor signal generating circuit via the head cable, an abnormality deciding circuit for deciding an abnormality of the projection head based on information obtained by the monitor signal sensing circuit, a power controlling circuit for supplying a power to the projection head, and a timing controlling circuit for controlling a timing such that the power controlling circuit supplies a pulse power to the light projecting device driving circuit. According to this configuration, the abnormality of the projection head can be monitored on the controller side based on the monitor signal. Therefore, the number of members provided to the projection head side can be reduced, and a size reduction of the head can be achieved while maintaining the safety.

Also, in the third photoelectric switch of the present invention, the projection head further includes a second monitoring light receiving device for receiving a part of the light emitted from the light projecting device, the projected light quantity controlling device of the projection head senses an abnormality of the projection head based on a monitor signal obtained from the first monitoring light receiving device and suppresses a light projected from the light projecting device, and the controlling portion of the controller senses an abnormality of the projection head based on a monitor signal obtained from the second monitoring light receiving device to be monitored via the head cable, and suppresses a light projected from the light projecting device. According to this configuration, two monitoring light receiving devices are provided in plural to the projection head and the dual control can be realized in such a manner that a feedback control is executed on the projection head side by using one monitoring light receiving device and the abnormality monitoring of the projection head is executed on the controller side by using the other monitoring light receiving device. Therefore, the photoelectric switch can be utilized with high reliability while achieving a size reduction of the sensor head by reducing the member provided to the projection head side. The controller senses the abnormality of the projection head by monitoring the monitor signal obtained by the second monitoring light receiving device via the head cable, and then suppresses or stops the light projection when the abnormality is caused. As a result, the dual feedback capable of monitoring the abnormality of the light projecting device by both the projection head and the controller can be realized.

Also, in the fourth photoelectric switch of the present invention, the projection head further includes a monitor signal initial value holding portion for holding an initial value of the monitor signal obtained from the monitoring light receiving device. Since normally the monitoring light receiving device has a large variation of the monitor current, a gain must be adjusted by the trimmer, or the like every projection head such that the monitor signal responding to a reference quantity of projected light can be kept constant. In contrast, since the initial value of the monitor signal is stored in the projection head, the appropriate abnormality decision can be executed on the controller side in response to the connected projection head without the troublesome trimmer adjustment, and the like.

Also, in the fifth photoelectric switch of the present invention, the projection head further includes a DC lighting sensing circuit for sensing a continuous lighting of the light projecting device to control the lighting of the light projecting device. According to this configuration, the lighting condition of the light projecting device is monitored by the DC lighting sensing circuit, and then a process of turning OFF the light projecting device, or the like is executed when it is sensed by the DC lighting sensing circuit that the pulse lighting is shifted to the DC lighting due to any cause. Therefore, the safety can be ensured.

Also, in the sixth photoelectric switch of the present invention, the head cable includes a power line for supplying a power to drive the light projecting device, a command line for instructing a projection and a suppression of the light projecting device, and a GND line. According to this configuration, the light projecting device is turned ON when the command is issued from the command line, while the signal is turned OFF when the abnormality of the projection head is sensed on the controller side, or the like to suppress the projection. Therefore, the projection command line and the projection suppress command line are uniformalized and the number of signal lines of the head cable can be reduced and this configuration can contribute to a size reduction of the projection head.

Also, in the seventh photoelectric switch of the present invention, the head cable includes a signal power line for sending out a power to drive the light projecting device at a timing at which the light projecting device projects the light, and a GND line. According to this configuration, since the power supplied via the power line is sent out in a pulse fashion and the power is supplied only when the light projecting device is turned ON, the command lie and the power line can be used in common. Therefore, the number of signal lines can be further reduced and wiring saving can be achieved.

Also, in the eighth photoelectric switch of the present invention, the projection head further includes a slit plate which is arranged to face to a light emitting surface of the light projecting device and in which a plurality of slit holes each having a different inner diameter are opened, and a slit switching portion for switching a position of the slit plate such that any one of a plurality of slit holes of the slit plate faces to the light emitting surface of the light projecting device, whereby a spot diameter of the light projecting device is restricted in a desired size when the slit switching portion adjusts positions of the slit holes of the slit plate such that one of slit holes faces to the light emitting surface of the light projection device, and the controller is constructed to sense the position of the slit plate of the projection head. In the projection head that varies an irradiated spot diameter by utilizing the slit plate, since a quantity of emitted light is changed by switching the slit hole, a reference value of the monitor signal used to sense a single failure is also changed. In this case, such reference value can be changed into a reference value for an appropriate criterion responding to the selected spot diameter by sensing a position of the slit plate of the projection head on the controller side.

Also, in the ninth photoelectric switch of the present invention, the controller further includes an abnormality outputting portion for informing an abnormality when the abnormality outputting portion senses the abnormality of the projection head. According to this configuration, an error information can be issued on the controller side.

Also, in the tenth photoelectric switch of the present invention, the controlling portion of the controller controls the power controlling circuit to stop the light projected from the light projecting device when the controlling portion senses the abnormality of the projection head. According to this configuration, a light projection can be stopped on the controller side when the abnormality occurs.

Also, the eleventh photoelectric switch of the present invention further includes a reception head having the light receiving device.

Further, a twelfth photoelectric switch of the present invention, includes a projection head having a semiconductor laser as a light projecting device that projects a sensing light toward a sensing area; a reception head having a light receiving device for receiving a light from the sensing area of the light projecting device; a controller having a controlling portion provided separately from the projection head, for controlling a light projected from the light projecting device and also executing a sensing operation based on a quantity of received light of the light receiving device; and a head cable for connecting electrically the projection head and the controller; wherein the projection head includes a first monitoring light receiving device for receiving a part of a light that the light projecting device emits, and a projected light quantity controlling device for executing a control such that a first monitor signal obtained by the first monitoring light receiving device is kept constant to maintain a quantity of projected light of the light projecting device at a predetermined value, and the controlling portion of the controller senses an abnormality of the projection head based on a monitor signal obtained from the first monitoring light receiving device to be monitored via the head cable, and suppress a light projected from the light projecting device. According to this configuration, the separate type photoelectric switch, in which the projection head is separated from the controller, is constructed such that the abnormality of the projection head can be monitored on the controller side. Therefore, the number of members provided to the projection head side can be reduced, and a size reduction of the head can be achieved while maintaining the safety.

According to the photoelectric switch of the present invention, a reduction in size of the sensor head can be achieved while making it possible to sense/control a single failure of the photoelectric switch using the light projecting device such as LD, or the like.

DETAILED DESCRIPTION OF THE INVENTION

Embodiments of the present invention will be explained with reference to the drawings hereinafter. In this event, the embodiments given in the following merely illustrate the photoelectric switch used to embody a technical idea of the present invention, and the present invention does not intend to limit the photoelectric switch to the followings. Also, this specification never intends to limit the members set forth in claims to the members recited in the embodiments. In particular, size, material, shape, and relative arrangements, and others of the constituent parts recited in the embodiments do not intend to limit a scope of the present invention to such constituent parts themselves unless the particular mention is not made, but give mere explanatory examples. Here, size, positional relation, etc. of the members shown in respective drawings are sometimes exaggerated to clarify the explanation. In addition, the same names and symbols denote the same or like members in the following explanation, and their detailed explanation will be omitted appropriately. Further, respective elements constituting the present invention may be accomplished in a mode that one member is used as a plurality of elements by constructing a plurality of elements by the same member or conversely a function of one member is divided among a plurality of members.

Figure 1A:
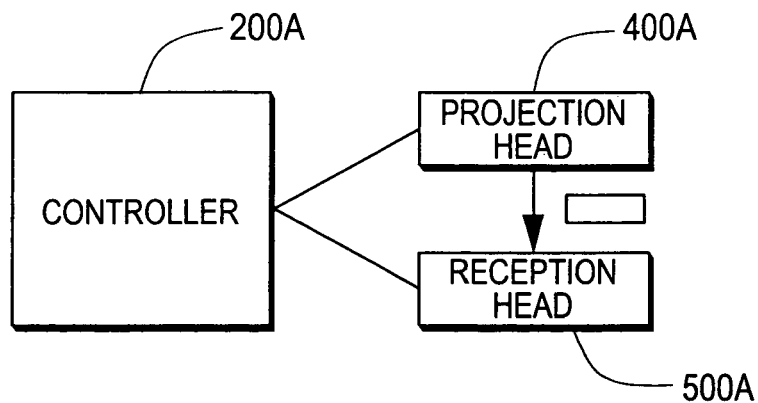
FIG. 1A is a schematic view showing an exemplary, non-limiting transmission photoelectric sensor to which the present invention can be applied.
Figure 1B:
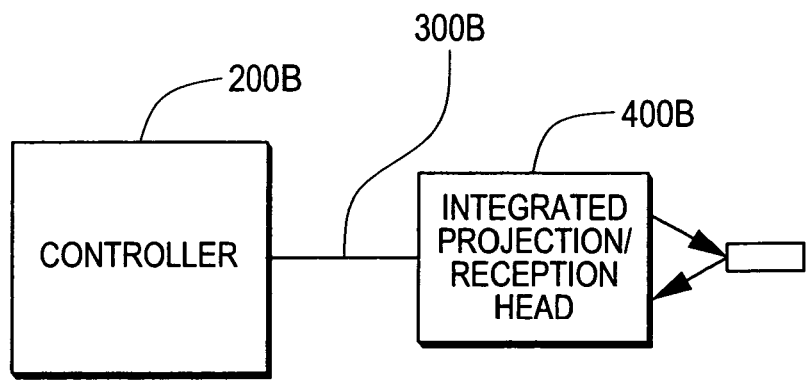
FIG. 1B is a schematic view showing an exemplary, non-limiting reflection photoelectric sensor to which the present invention can be applied.
Figure 1C:
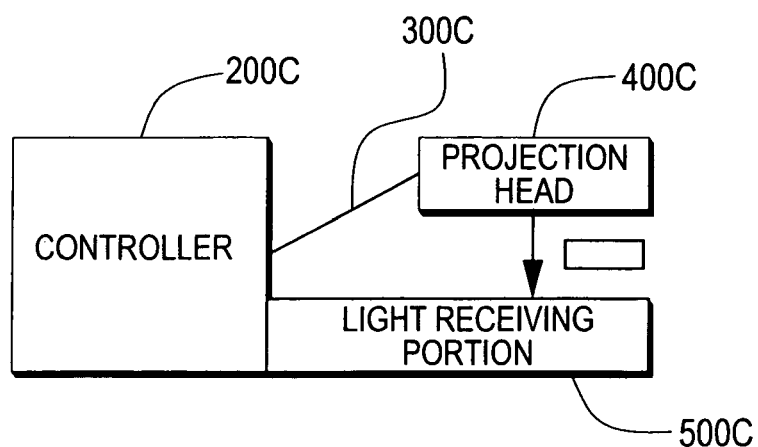
FIG. 1C is a schematic view showing an exemplary, non-limiting configuration, to which the present invention can be applied, in which a controller and a reception head of the transmission photoelectric sensor are integrated.

A photoelectric sensor of the present invention can be applied to the amplifier-separated photoelectric sensor in which a controller and a projection head are separated. Here, a light receiving portion may be constructed in any mode and can be applied to various photoelectric sensors such as the transmission type, the reflection type, and the like. For example, as shown in FIG. 1A, the present invention may be applied to a transmission photoelectric sensor wherein a reception head 500A is constructed as a separate body from a projection head 400A and a controller 200A. As shown in FIG. 1B, such a configuration may be employed that an integrated projection/reception head 400B of a reflection photoelectric sensor in which a projection head and a reception head are integrated is connected to a controller 200B via a head cable 300B. Alternatively, as shown in FIG. 1C, such a configuration may be employed that a controller 200C of a transmission photoelectric sensor in which a light receiving portion 500C is built integrally is connected to a projection head 400C via a head cable 300C. An example in which the present invention is applied to the transmission photoelectric sensor shown in FIG. 1A will be explained hereinafter. In this case, when the reflection photoelectric sensor for sensing a quantity of received light of a reflected light of a sensed light is constructed, respective positions and directions of the projection head and the reception head are set such that a light projected from the projection head is reflected from a sensed object and incident on the reception head. Alternately, the projection/reception head in which the projection head and the reception head are integrated may be employed. Also, as the head cable for connecting the sensor head and the controller, an optical fiber, and the like may be utilized in addition to the electric cable.

Figure 2:
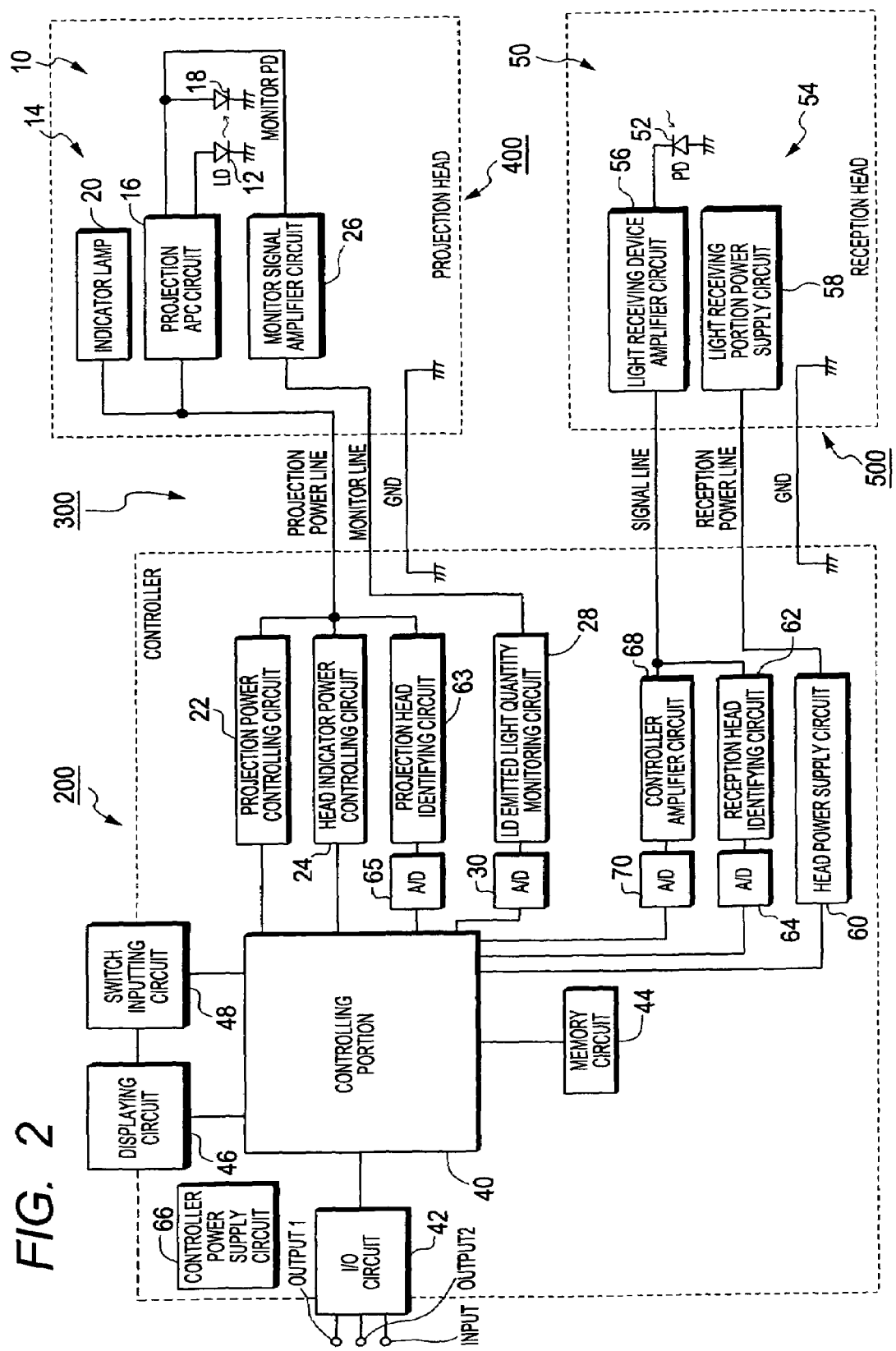
FIG. 2 is a block diagram showing a photoelectric switch according to an exemplary, non-limiting embodiment of the present invention.

As described above, in the transmission photoelectric sensor, the projection head and the reception head are connected to the controller, then a light emitted from the light projecting device in the projection head is received and sensed by the reception head, and then a passing of the object, etc. can be sensed based on a change in a quality of received light. As a photoelectric switch according to an embodiment of the present invention, a block diagram of a photoelectric sensor in which a projection head 400 and a reception head 500 are connected to a controller 200 is shown in FIG. 2. In this photoelectric switch shown in FIG. 2, the projection head 400 and the reception head 500 are connected via a head cable 300. The projection head 400 has a light projecting portion 10 and the reception head 500 has a light receiving portion 50. The light projecting portion 10 projects a light onto the object and then decides the presence/absence of the object by sensing whether the light receiving portion 50 receives this light that is not intercepted by this object or a reduction in a quantity of received light caused when this light is intercepted is sensed. The controller 200 outputs a predetermined pulse to the projection head 400 to drive the light projecting portion 10. A light projecting device 12 is driven by an oscillation pulse output from a projection power controlling circuit 22 under control of a controlling portion 40, and emits a pulse light to the sensed object on the outside. The received light is subjected to the photoelectric conversion by the light receiving element 50, and then fed to the controlling portion 40 via a light receiving device amplifier circuit 56, a controller amplifier circuit 68, and an A/D converter 70. Accordingly the detection is applied in synchronism with the pulse light, and then an ON/OFF signal indicating the sensed result is output from an I/O circuit 42.

(Light Projecting Portion 10)

The light projecting portion 10 has the light projecting device 12 for projecting a light, and a projecting circuit 14 for driving the light projecting device 12. The LED, the LD, or the like can be utilized as the light projecting device 12. In particular, since the LD has a larger quantity of light and a higher directivity than the LED, a spot diameter can be narrowed and thus a sensing precision can be improved. Also, since the spot diameter of the light irradiated from the LD can be confirmed visually, the LD is excellent in installing workability. Therefore, in the present embodiment, the LD that is excellent in the optical characteristics is utilized as the light projecting device 12. Also, the projecting circuit 14 for driving the LD has a projection APC circuit 16, and a monitoring light receiving device 18 such as a monitor PD, or the like. The projection APC circuit 16 supplies a driving power to the LD to drive the LD, and controls the output of the LD, i.e., a quantity of emitted light, at a predetermined value.

Also, the projection head 400 has an indicator lamp 20 to display a quantity of emitted light of the controller, an output state, and the like. The projection APC circuit 16 and the indicator lamp 20 receive a supply of a driving power from the projection power controlling circuit 22 and a head indicator power controlling circuit 24 via a projection power line respectively.

A quantity of emitted light of the light projecting device 12 is controlled by the projection APC circuit 16. The projection APC circuit 16 executes a feedback control in such a manner that an amount of current is adjusted based on a quantity of emitted light sensed by the monitor PD to get a predetermined value of a quantity of emitted light in driving the LD. In an example shown in FIG. 2, the projection APC circuit 16 is connected to the LD and the monitor PD serving as the monitoring light receiving device 18, and the monitor PD is placed adjacent to the LD in a position in which such monitor PD can receive a leakage light, or the like from the LD. The monitor PD can also be built in an LD package.

Meanwhile, the monitor PD as one mode of the monitoring light receiving device 18 is connected to a monitor signal amplifier circuit 26, and sends out a quantity of received light to an LD emitted light quantity monitoring circuit 28 in the controller 200 as a monitor voltage via a monitor line contained in the head cable 300. The monitor signal amplifier circuit 26 is a member used to suppress a variation of the monitoring light receiving device 18, and is composed of a trimmer, or the like. The LD emitted light quantity monitoring circuit 28 outputs the monitor voltage sensed by the monitor PD to the controlling portion 40 via an A/D converter 30 that converts an analog signal into a digital signal. In this manner, the monitor signal amplifier circuit 26 constitutes a monitoring circuit that monitors a quantity of emitted light of the light projecting device 12 by the monitoring light receiving device 18. Thus, the controlling portion 40 can sense the abnormality of the projection head by monitoring the monitor voltage via the monitoring circuit. When the abnormality is sensed, e.g., the monitor voltage exceeds a predetermined threshold value, or the like, the controlling portion 40 can stop a current supply to the projection head 400 by limiting, blocking, or the like the projection power controlling circuit 22 and therefore the controlling portion 40 can respond to the trouble of the light projecting device, and the like. In this manner, the dual feedback system is accomplished such that the feedback control of a quantity of projected light is applied by the projection head 400 and also the abnormality sensing of the projection head 400 is carried out on the controller 200 side.

Figure 3:
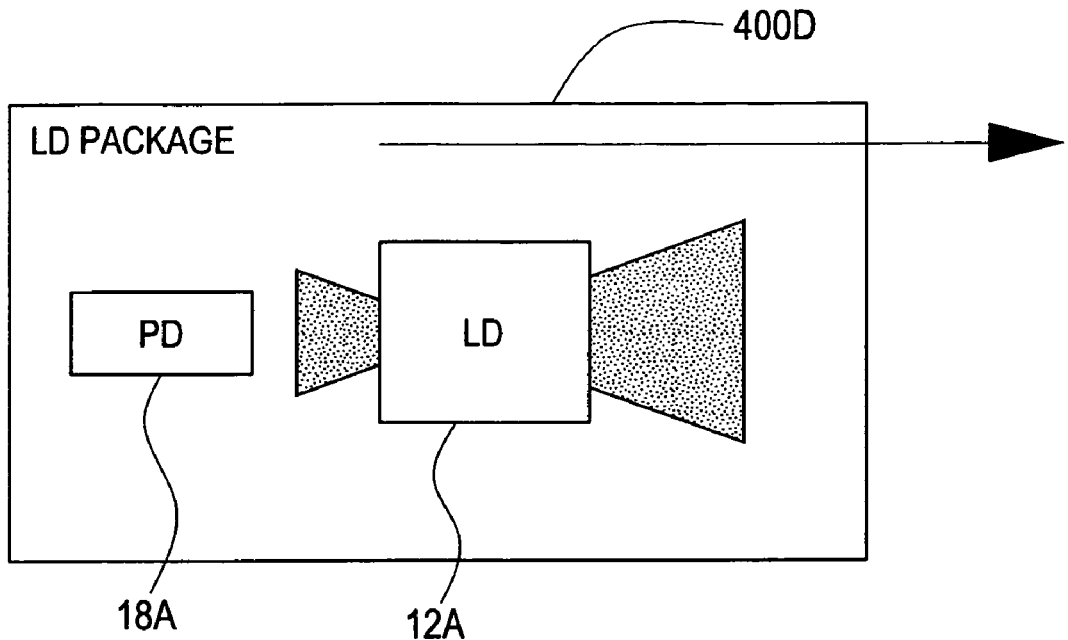
FIG. 3 is a schematic view showing an example in which a monitor PD is arranged at the back of an LD.
Figure 4:
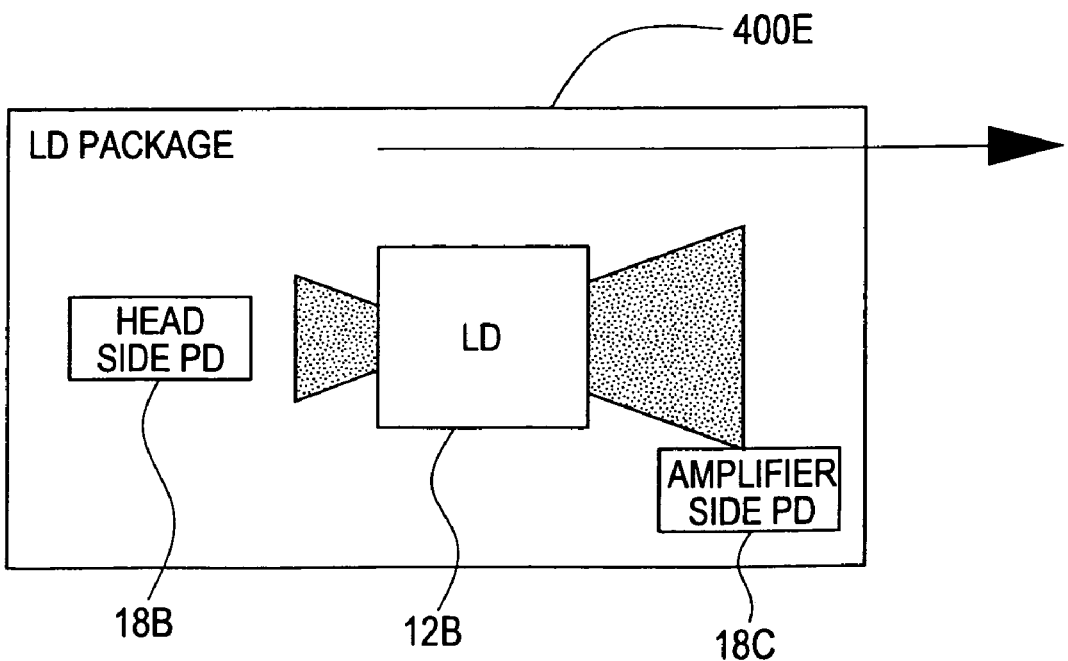
FIG. 4 is a schematic view showing an example in which a monitor PD is arranged in front of and at the back of the LD respectively.

Also, the monitoring light receiving device may be provided in plural. For example, the monitoring PD may be prepared in the projection head and the controller respectively, and then the monitoring PD for the projection head may be used to control the projection head and the monitoring PD for the controller may be used to control the controller. At this time, as shown in FIG. 3, a monitor PD 18A is arranged at the back of an LD 12A to monitor a light emitted from the back out of the lights emitted from the front and back sides of the LD 12A, and then the monitor current may be transferred to a projection head 400D and the controller. Alternately, as shown in FIG. 4, a second monitor PD 18C may also be arranged in front of the LD 12B in addition to a monitor PD 18B being arranged at the back side of an LD 12B, and then the light that the LD 12b emits to the front side is sensed by the second monitor PD 18C, whereby one monitor PD may be employed to control a quantity of projected light at the projection head 400E and the other monitor PD may be employed to sense a quantity of projected light on the controller side.

In this specification, sensed information typically signifies a quantity of received light sensed by the light receiving device. In the quantity-of-received-light type photoelectric sensor, a sensing operation to decide the presence/absence, or the like of the sensed object is executed based on a level of a quantity of received light. Here, the sensed information is not restricted to a quantity of received light and other information can be utilized. For example, in the range type (position type) photoelectric sensor using the position sensitive photodiode (PSD) or the split PD as the light receiving device, a sensing operation is executed based on its light receiving position. The present invention is applicable to such photoelectric sensor.

(Light Receiving Portion 50)

Meanwhile, the light receiving portion 50 contained in the reception head 500 has a light receiving device 52 for receiving a light, and a light receiving circuit 54 for driving the light receiving device 52. The light receiving circuit 54 has the light receiving device amplifier circuit 56, a light receiving portion power supply circuit 58, and the like. The PD, or the like can be utilized as the light receiving device 52. The light receiving device 52 is connected to the light receiving device amplifier circuit 56, and a quantity of received light sensed by the light receiving device 52 is amplified by the light receiving device amplifier circuit 56 and then sent out to the controller amplifier circuit 68 on the controller 200 side via a signal line contained in the head cable 300. The analog signal amplified by the controller amplifier circuit 68 is converted into a digital signal by the A/D converter 70 and input into the controlling portion 40. Thus, the controller 200 side senses a quantity of received light of the light receiving device 52 to make a sensing decision and finally outputs a decision result from the output of the I/O circuit 42. This I/O circuit 42 has two-system outputs 1, 2 and one-system input 1. Also, the light receiving portion power supply circuit 58 is the member used to supply a driving power of the reception head 500, and is connected to a head power supply circuit 60 of the controller 200 via a reception power line of the head cable 300. The head power supply circuit 60 is controlled by the controlling portion 40 of the controller 200.

In case plural types of sensor heads should be connected to the controller, an identifying function of identifying respective sensor heads can be provided. In the example in FIG. 2, a projection head identifying circuit 63 for identifying the projection head 400 and a reception head identifying circuit 62 for identifying the reception head 500 are provided to the controller 200. These head identifying circuits are connected to respective signal lines, sense the identification signals of the projection head 400 and the reception head 500, and send out the signals to the controlling portion 40 via A/D converters 64, 65. Then, the controlling portion 40 identifies respective sensor head.

In the controller 200, the projection power controlling circuit 22, the head indicator power controlling circuit 24, the LD emitted light quantity monitoring circuit 28, the controller amplifier circuit 68, the reception head identifying circuit 62, the head power supply circuit 60, and the like are connected to the controlling portion 40. Also, a memory circuit 44, a displaying circuit 46, a switch inputting circuit 48, the I/O circuit 42, and the like are connected to the controlling portion 40. The memory circuit 44 stores various set values, etc. The displaying circuit 46 displays the information on the controller 200 side. The operating portion as the user interface which accepts the set value adjustment to input various settings and operations into the controller 200 is connected to the switch inputting circuit 48. The I/O circuit 42 inputs/outputs the information or data into/from the external device.

Also, the controller 200 has a controller power supply circuit 66 to drive these circuits. One or plural sets of the projection head 400 and the reception head 500 are connected to the controller 200 via the head cable 300, then the object is sensed by receiving a light projected from the light projecting device 12 via the light receiving device, and then the result is output.

EXAMPLE 1

Figure 5:
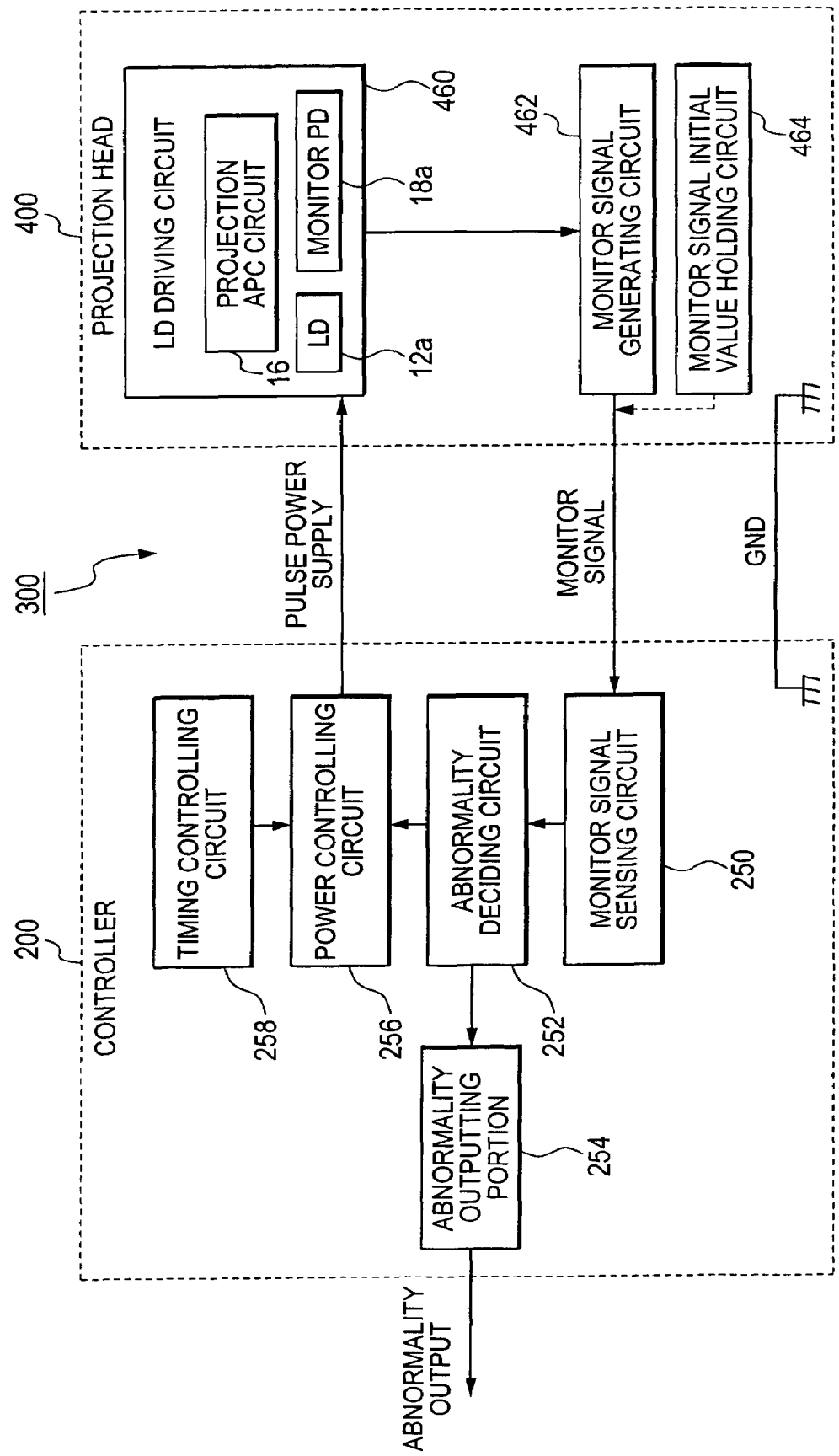
FIG. 5 is a block diagram showing an exemplary, non-limiting configuration of a photoelectric sensor according to Example 1 of the present invention.
Figure 22:
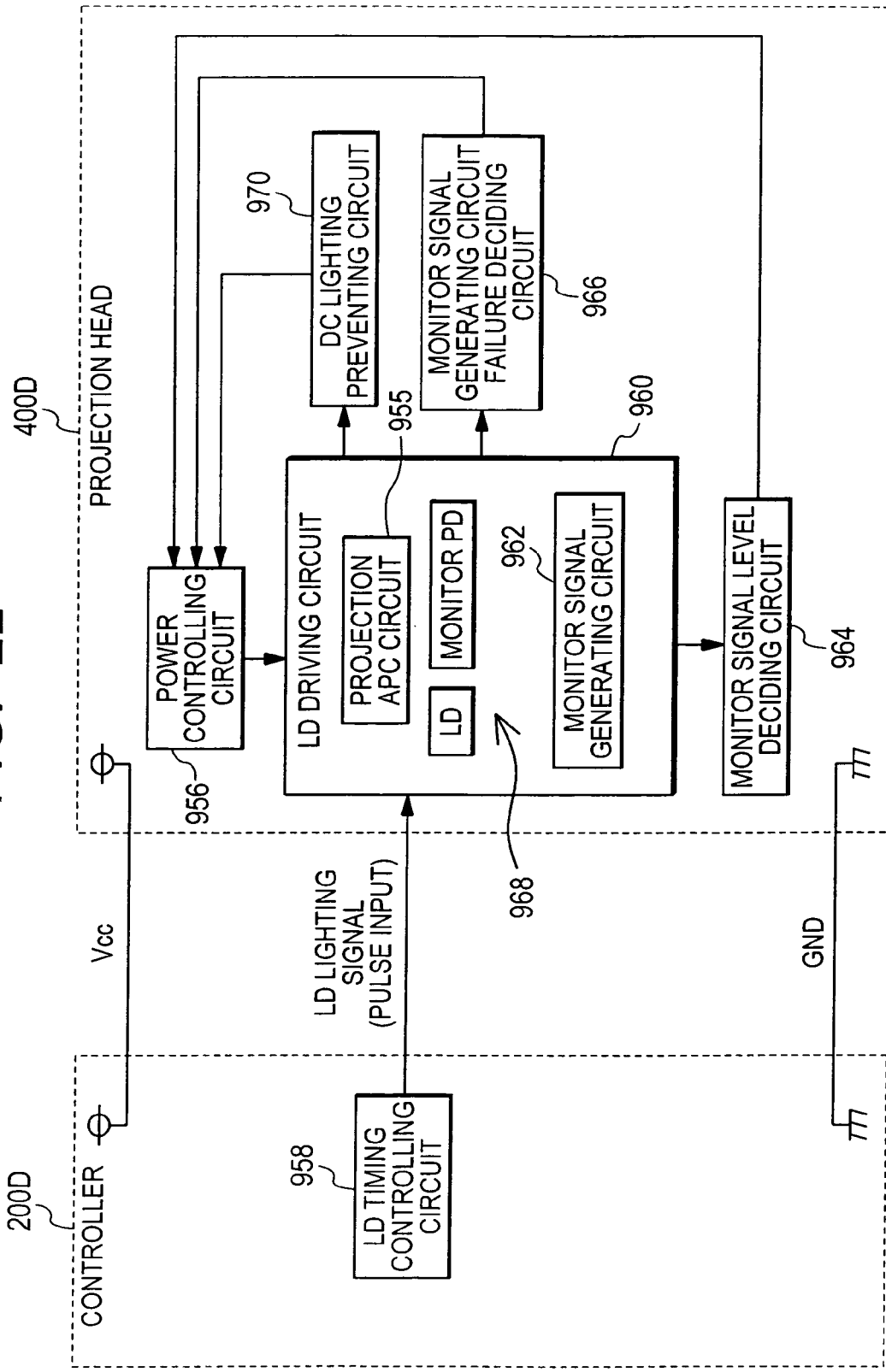
FIG. 22 is a block diagram showing a configurative example of a photoelectric sensor having a protecting circuit.
Figure 23:
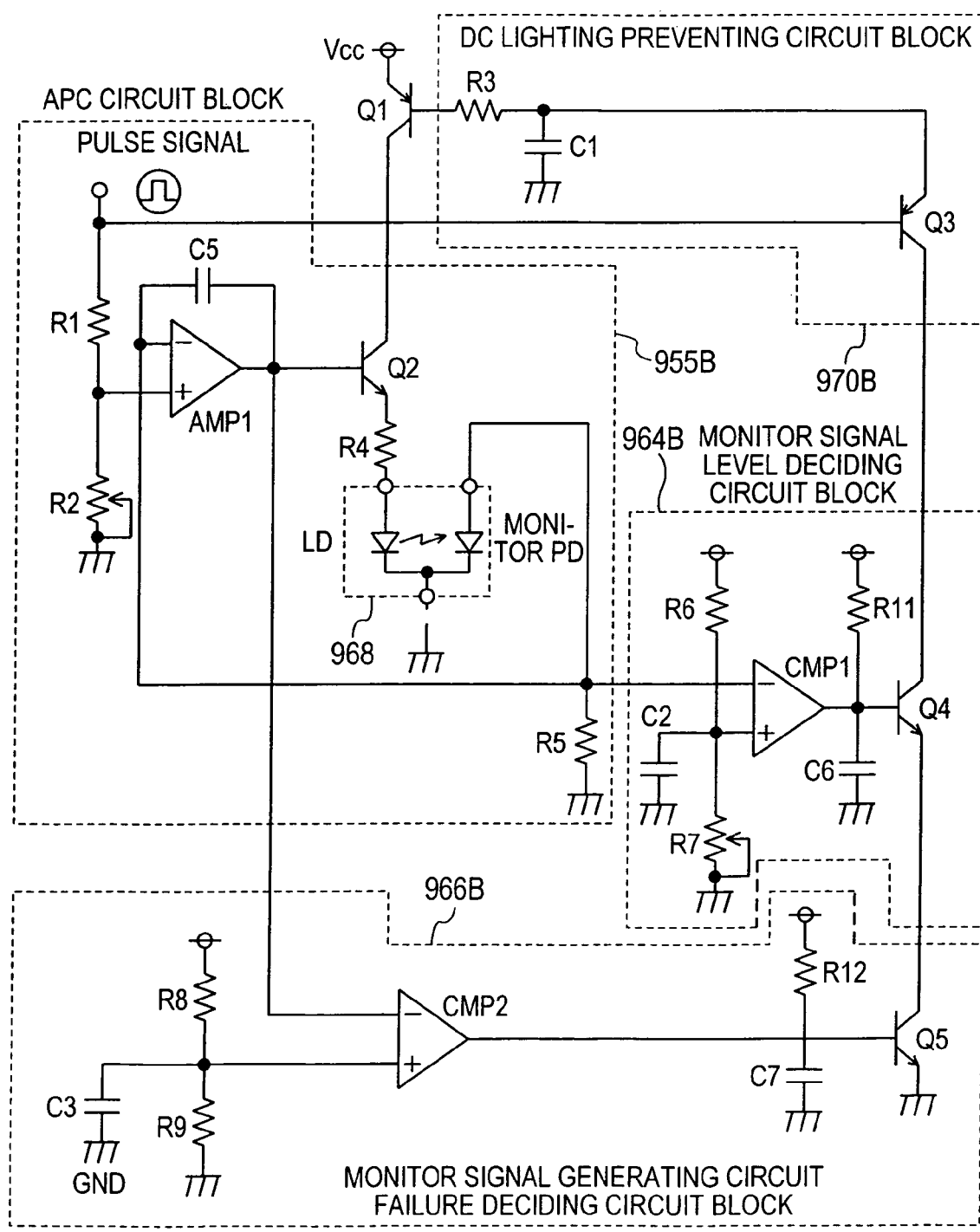
FIG. 23 is a circuit diagram showing an example of a circuit constituting the protecting circuit.

A configuration of an exemplary, non-limiting photoelectric sensor according to Example 1 of the present invention is shown in a block diagram of FIG. 5. In this photoelectric sensor shown in FIG. 5, the projection head 400 is connected to the controller 200 via the head cable 300. The projection head 400 includes an LD 12a as the light projecting device 12, a monitor PD 18a as the monitoring light receiving device, an LD driving circuit 460, a monitor signal generating circuit 462, and a monitor signal initial value holding circuit 464. The LD driving circuit 460 is the light projecting device driving circuit containing the projection APC circuit 16 constituting a projected light quantity controlling device. The monitor signal generating circuit 462 generates a monitor signal based on a quantity of received light sensed by the monitor PD 18a. The monitor signal initial value holding circuit 464 holds an initial value of the monitor signal generated by the monitor signal generating circuit. The controlling device such as the projection APC circuit 16, and the like may be constructed by a gate array, a microcomputer, and the like. In contrast, the controller 200 includes a monitor signal sensing circuit 250, an abnormality deciding circuit 252, an abnormality outputting portion 254, a power controlling circuit 256, and a timing controlling circuit 258. The monitor signal sensing circuit 250 senses the monitor signal generated by the monitor signal generating circuit 462. The abnormality deciding circuit 252 decides an abnormality of the projection head 400 based on the information obtained by the monitor signal sensing circuit 250. The abnormality outputting portion 254 outputs the abnormality being output from the abnormality deciding circuit 252. The power controlling circuit 256 supplies a power to the projection head 400. The timing controlling circuit 258 controls a timing at which the power controlling circuit 256 supplies a pulse power to the light projecting device driving circuit. In this case, illustration of the reception head is omitted in FIG. 5. In the projection head 400 shown in FIG. 5, various protecting circuits shown in FIG. 22 are removed from the projection head 400 of the separate type photoelectric sensor, in which the projection head 400 is separated from the controller 200, as much as possible and in turn the controller 200 side senses the abnormality. Therefore, the members of the projection head can be reduced to attain a size reduction, while maintaining a highly reliable operation responding to a single failure in addition to the control made by the projection APC circuit 16, and the like on the projection head 400 side.

(Light Projecting Circuit)

Figure 6:
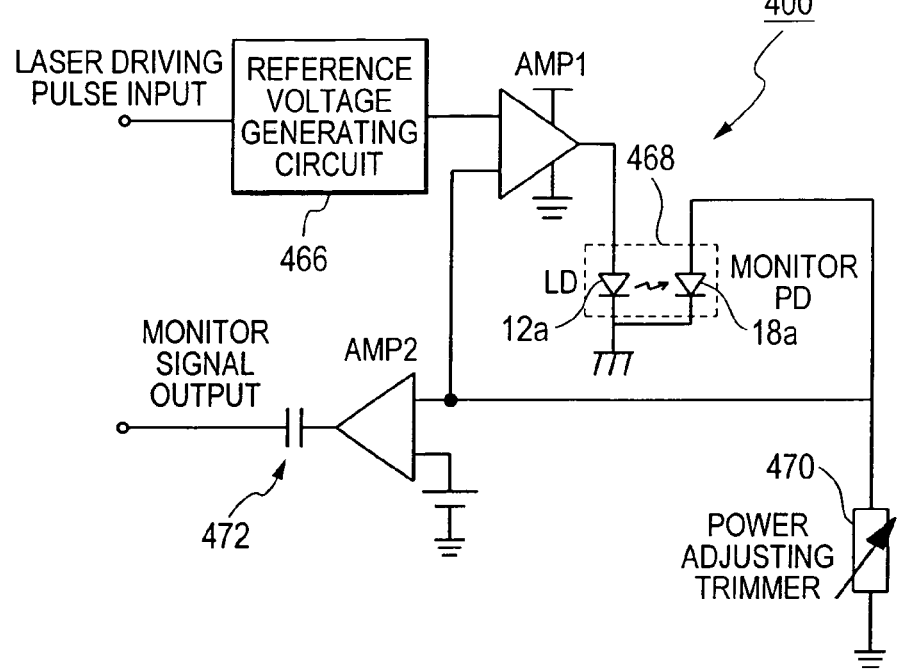
FIG. 6 is a block diagram showing an example of a projection head circuit corresponding to FIG. 5.

An example of the projection head circuit corresponding to FIG. 5 is shown in FIG. 6. The projection head 400 shown in FIG. 6 has a reference voltage generating circuit 466, an amplifier AMP1, and an LD module 468, in which the LD 12a and the monitor PD 18a are built, as the LD driving circuit 460, and also has a power adjusting trimmer 470 and an amplifier AMP2 as the monitor signal generating circuit 462. The amplifier AMP2 is connected to the monitor signal output terminal via a filter 472. The projection head 400 receives an LD driving pulse input from the power controlling circuit 256 of the controller 200 at a timing specified by the timing controlling circuit 258, and causes the LD driving circuit 460 to drive the LD 12a in response to this pulse input. Also, the projection head 400 generates a predetermined monitor voltage adjusted by the power adjusting trimmer 470 in response to a quality of received light of the monitor PD 18a, and sends back this voltage to the LD driving circuit 460 to execute the control and sends out this voltage to the controller 200 side as a monitor signal output $V_{mon}$ via the monitor signal line. The power adjusting trimmer 470 is used to correct a variation of the monitor PD 18a existing every LD module 468. That is, the power adjusting trimmer 470 is adjusted such that a quantity of received light that the monitor PD 18a senses has a constant value in response to a constant input. The controller 200 shown in FIG. 5, etc. A/D-converts the monitor signal output by the monitor signal sensing circuit 250, and sends out it to the abnormality deciding circuit 252 to make an abnormality decision of the projection head. Accordingly, because the abnormality of the projection head 400 can be sensed on the controller 200 side, the abnormality outputting portion 254 connected to the abnormality deciding circuit 252 outputs a warning signal such as an alarm, or the like, as the case may be, to realize the error information. In this manner, because the abnormality of the projection head 400 is sensed on the controller 200 side, the occurrence of abnormality can be output from the abnormality outputting portion 254 to the external device. Also, a displaying device such as the displaying circuit 46, or the like may be provided to the controller 200, and the abnormality may be displayed by the displaying device at a time of abnormality.

Figure 7:
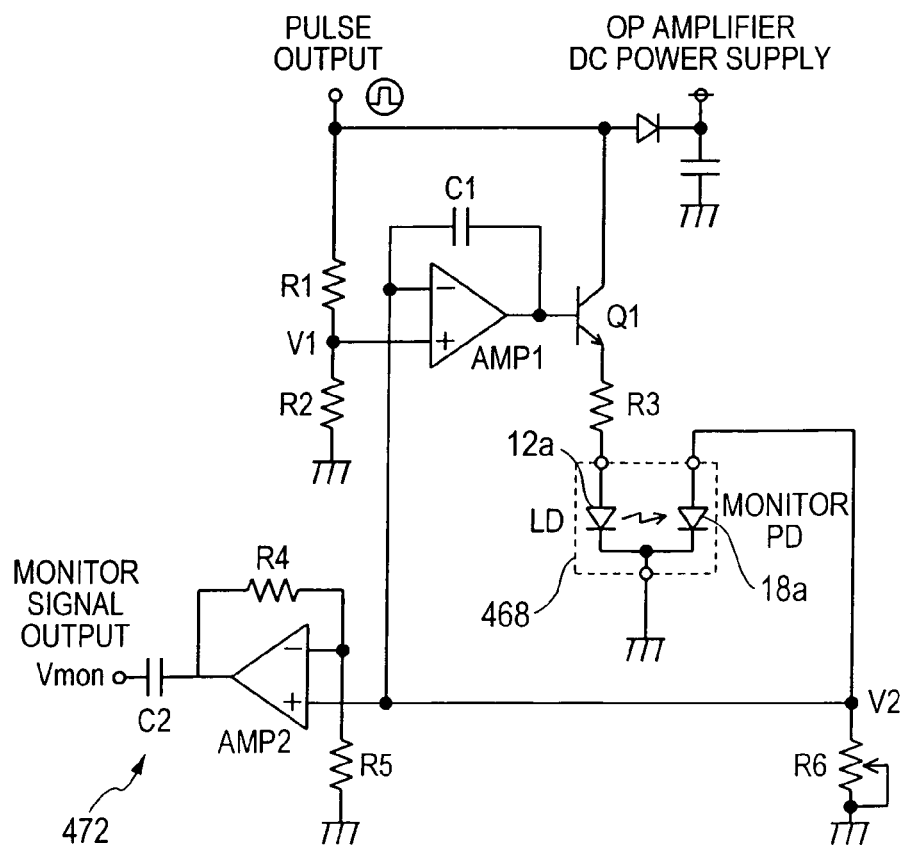
FIG. 7 is a circuit diagram showing an example of a more concrete circuit of the projection head in FIG. 6.

In addition, an example of the more concrete circuit of the projection head is shown in FIG. 7. The projection head 400 shown in FIG. 7 has resistors R1, R2 connected in series to the pulse input terminal, and the amplifier AMP1 as the reference voltage generating circuit 466. A voltage value $V_1$ voltage-divided by the resistors R1, R2 is input into the (+) side of the amplifier AMP1, and a capacitor C1 is connected between the (−) side and an output of the amplifier AMP1. Also, the output of the amplifier AMP1 is connected to a base of a transistor Q1. Also, an emitter of the transistor Q1 is connected to LD module 468 via a resistor R3. While, the pulse input terminal is connected to an OP amplifier DC power supply via a reverse-blocking diode, or the like. The reference voltage generating circuit 466 is not limited to such configuration, and the already-known configuration can be employed appropriately.

Also, the power adjusting trimmer 470 constituting the monitor signal generating circuit 462 is formed of a variable resistor R6. This power adjusting trimmer is connected to the monitor PD 18a side of the LD module 468 via GND, and also is connected to the (−) side of the amplifier AMP1 and the (+) side of the amplifier AMP2. While, the (−) side of the amplifier AMP2 is voltage-divided by resistors R4, R5 and the other end of the resistor R4 is connected to the output side of the amplifier AMP2. In addition, the output side of the amplifier AMP2 acts as the monitor signal output terminal via a capacitor C2 constituting the filter 472. This capacitor C2 functions as the DC lighting sensing circuit. According to such simple circuit configuration, the monitor signal sensed by the monitor PD 18a can be fed back to the LD driving circuit 460 as a monitor voltage $V_2$, and also can be output to the controller side from the monitor signal output terminal as the monitor signal output $V_{mon}$.

Both a current value and a voltage value can be utilized as the monitor signal to monitor the abnormality. For example, the conversion from the monitor current into the monitor voltage can be carried out by the I-V conversion using the resistor. In the present embodiment, the current sensed by the monitor PD is amplified, and then the monitor signal output $V_{mon}$ generated by the power adjusting trimmer is used as the monitor signal.

(Monitor Current)

Also, in order to monitor the abnormality of the projection head on the controller side, only the monitor current can be used. In order to monitor the abnormality only by the monitor current, it is not enough to decide simply whether or the monitor voltage $V_{mon}$ obtained by the I-V conversion of the monitor current of the monitor PD is larger than a predetermined threshold value, i.e., decide only the excess of the projection output or the failure of the parts of the monitor PD, and the like. Also, the sensing of the failure of other parts such as the power adjusting trimmer, and the like can be realized by sensing that an I-V converted value of the monitor current is dropped to the GND side, by using two threshold values. More particularly, an upper limit threshold value and a lower limit threshold value are set by using a comparator such as a window comparator, or the like, then the monitor current is monitored by using values within this range as normal threshold values, and then the failure is decided when the monitor current is in excess of the upper limit threshold value or below the lower limit threshold value. Thus, both the excess of the projection output and the DC lighting of the light projecting device or the non-lighting due to a disconnection, or the like can be monitored. Also, according to this configuration, the signal line of the head cable used to sense the failure of the parts except the monitor PD and transfer this state can be omitted. Thus, this configuration can contribute a further size reduction of the projection head.

Also, the monitor signal output may be passed through a filter such as HPF (high pass filter), or the like to cut out a DC component, and then an AC monitor signal can be sent out to the controller side. Thus, when the light projecting device is broken down and goes into its DC lighting state, the monitor output signal goes to a GND level, and accordingly the DC lighting abnormality can be decided by monitoring the monitor output on the controller side only at a lighting timing in synchronism with the pulse power supply. Thus, a processing burden in monitoring the abnormality can be lessened. On the contrary, when the monitor signal output is not passed through the filter such as HPF, or the like, it is impossible to sense the DC lighting unless the monitor output is monitored while the light projecting device is turned OFF. Thus, a processing burden in monitoring the abnormality is increased.

(Abnormality Sensing Procedures)

Figure 8:
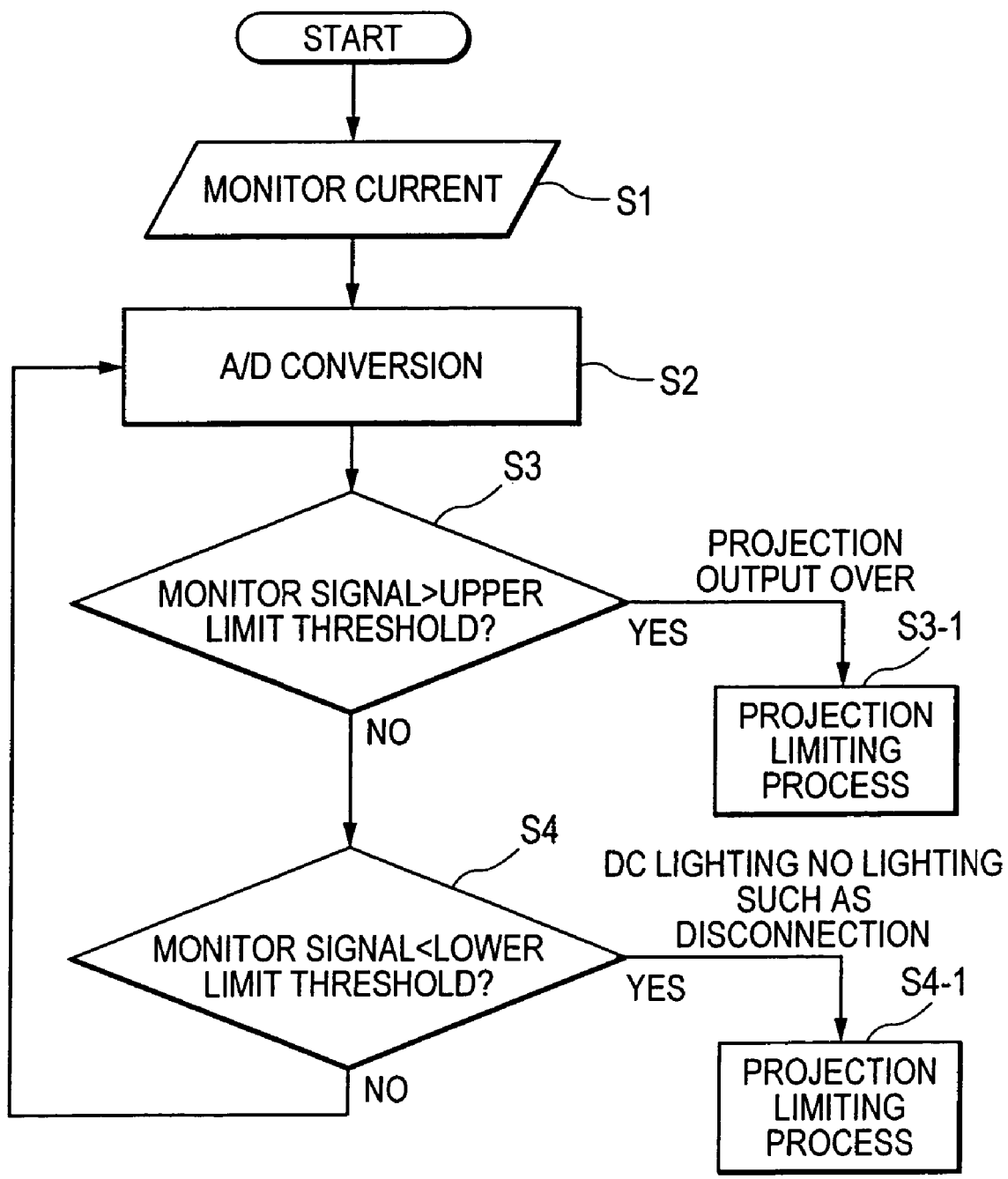
FIG. 8 is a flowchart showing procedures applied when the controller senses an abnormality by comparing a monitor current with a normal threshold value.

Then, procedures applied when the controller senses the abnormality by comparing the monitor current with a normal threshold value, as described above, will be explained with reference to a flowchart shown in FIG. 8. First, in step S1, the monitor current is acquired. Then, in step S2, the monitor signal is generated by the A/D conversion. Then, in step S3, the output control of the projection head side is executed. Here, the monitor signal is compared with predetermined standard values (threshold values). Then, if the monitor signal is higher than an upper limit threshold value, it is decided that the projection output exceeds an upper limit. Then, the process goes to step S3-1, wherein a projection limiting process is executed to stop the output of the light projecting device, limit an amount of output, or the like. In contrast, if the monitor signal is lower than the upper limit threshold value, the process goes to step S4. Then, it is decided whether or not the monitor signal is higher than a lower limit threshold value. If the monitor signal is lower than the lower limit threshold value, it is decided that the light projecting device is lightened continuously, or is not lightened due to a disconnection. Then, the process goes to step S4-1, wherein a predetermined projection limiting process is executed.

Figure 9:
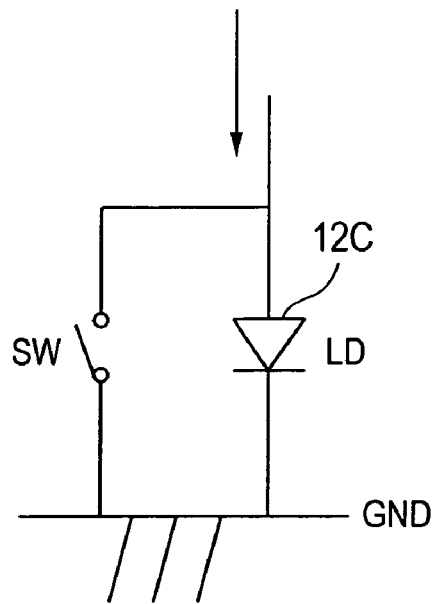
FIG. 9 is a schematic view showing a configuration in which a switch SW is arranged in parallel with the LD to suppress a light projection.

In this event, the projection limiting process mentioned in this specification contains not only the lighting stop of the LD by stopping a light projecting signal, cutting off a power supply, or the like but also the control to reduce the projection to a predetermined quantity of light by limiting an amount of current. Otherwise, as shown in FIG. 9, an approach of bypassing a current supply to an LD 12C by controlling ON/OFF of a switch SW, which is arranged in parallel with the LD 12C, to suppress the lighting may be employed. In this manner, since the safety can be ensured by not stopping the light projecting signal or the power supply but stopping or suppressing the light projection, these processes are also contained in the projection limiting process. Also, once the abnormality is caused, the output of the light projecting device can be kept at 0 until the process of reducing the output, resetting the light projecting device, or the like is carried out.

(Head Cable 300)

The projection head 400 and the controller 200 are connected electrically by the head cable 300. As the types of the signals required to be contained in the head cable 300, there are four types, e.g., a power supply line used to supply a power to drive the projection head 400, a projection command line used to instruct the projection of the light projecting device, a projection suppress command line used to instruct the projection head 400 to suppress the projection when the abnormality of the projection head 400 is sensed on the controller 200 side, and a GND (ground) line. In the prior art, as shown in FIG. 22, the signal lines necessary for the head cable are the power supply line Vcc, the pulse signal line for the LD lighting, and the GND line. In other words, in the prior art, since the failure sensing is executed on the projection head side, there is no need to instruct the projection head side to suppress the projection by sensing the abnormality on the controller side. That is, it is not needed to contain the projection suppress command line in the head cable. In contrast, in the present invention, since the abnormality of the projection head is sensed on the controller side, the projection suppress command line used to control the projection when the abnormality is sensed is required and thus the signal line contained in the head cable is increased.

Figure 10:
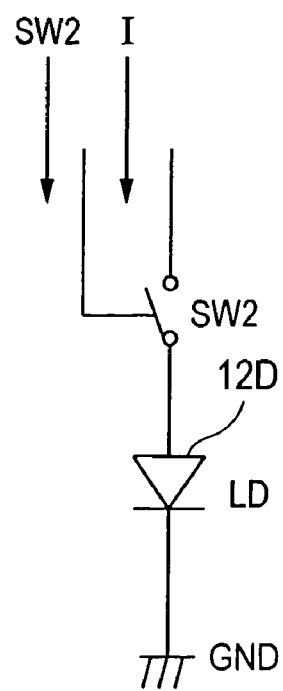
FIG. 10 is a schematic view showing a configurative example in which a projection command to turn ON a light projecting device and a projection suppress command to turn OFF the light projecting device are realized by a switching.

Therefore, the number of signal lines can be reduced by one line by uniformalizing the projection command and the suppress command. Here, the projection command for turning ON the light projecting device by the LD driving circuit 460 and the projection suppress command for turning OFF the light projecting device are accomplished by the switching. In detail, as shown in FIG. 10, in a circuit in which a switching element SW2 such as a transistor, or the like is provided between the power supply line and an LD 12D in the projection head, the switching element SW2 can be turned ON to project the light when the projection command is issued, while the switching element SW2 can be turned OFF to suppress or turn OFF the light projection of the LD 12D when the projection suppress command is issued. As a result, the projection command line and the projection suppress command line are used in common and thus the number of signal lines necessary for the head cable can be reduced to three.

Figure 11:
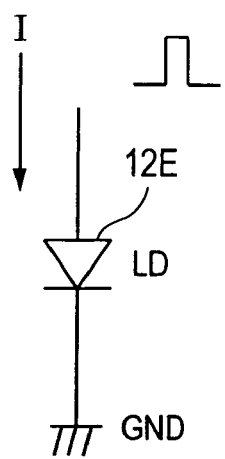
FIG. 11 is a schematic view showing a configurative example in which a power line and a signal line for the projection command and a projection suppress command are used in common.

However, in this case, the power line for supplying the power and the signal line for the projection command and the projection suppress command to drive the switching element must be provided still separately. Therefore, the number of the signal lines is further reduced by one if these lines can be provided in common, and thus the head cable can be constructed by two signal lines. Concretely, as shown in FIG. 11, the switching element consisting of the power supply and an LD 12E is not provided to the projection head, but the projection head is constructed such that the LD 12E is turned ON merely by supplying a power to the projection head. In this fashion, if the pulse signal is used as the power supply line Vcc, the power line from the controller to the projection head and the signal line to transmit the projection command and the projection suppress command to the projection head can be uniformalized and thus the number of lines in the head cable can be reduced to two. According to the configuration in which two signal lines for the projection command and the projection suppress command and the power line are integrated and the power is supplied only when the projection command is issued, the number of the signal lines can be reduced to two. As a result, such configuration can contribute to not only a reduction in size and cost of the head cable but also a reduction in size and cost of the projection head because of wiring saving.

Figure 12:
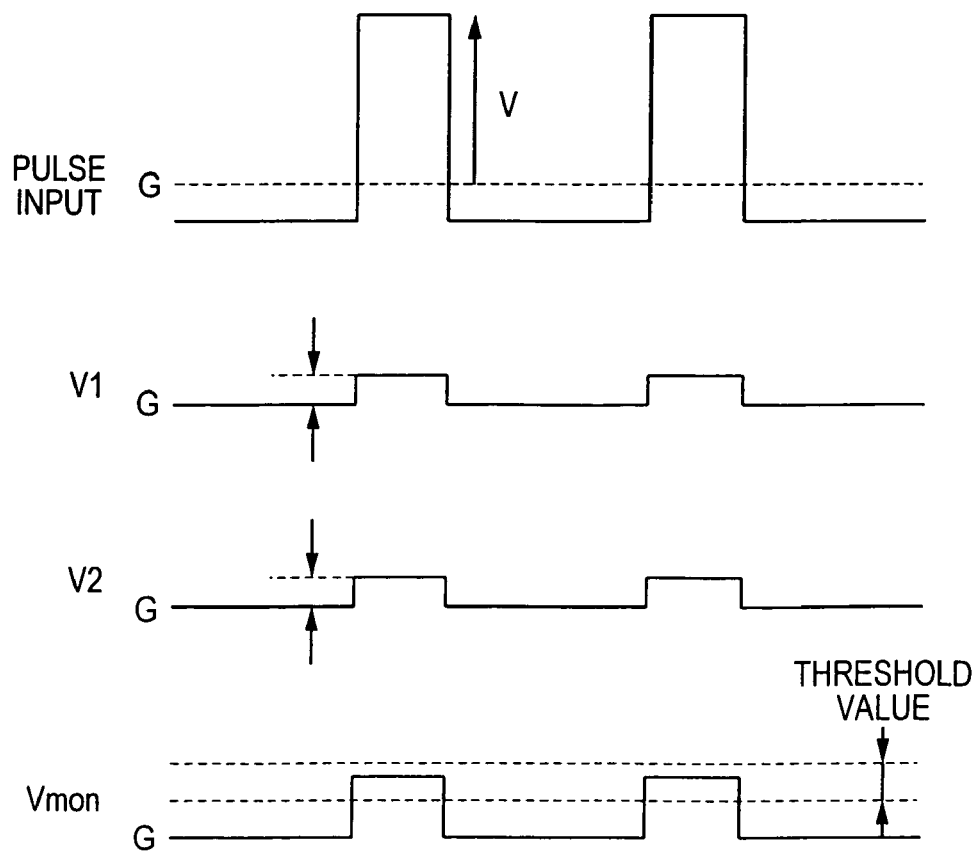
FIG. 12 is a graph showing waveform patterns of a pulse input, $V_1$, $V_2$, $V_{mon}$ in a normal operation of the projection head.

Next, an operation of the projection head in FIG. 7 in sensing the abnormality will be explained with reference to graphs in FIG. 12 to FIG. 15, in which waveform patterns of a pulse input, $V_1$, $V_2$, $V_{mon}$ are shown, hereunder. Here, G denotes a GND (ground) level in these Figures. FIG. 12 shows a normal operation of the projection head, and $V_1$, $V_2$ are output at almost equal amplitude in response to the pulse input. Also, the monitor signal output $V_{mon}$ is suppressed within a normal threshold value range in all projection heads as the result that a variation of each projection head portion has been adjusted by the power adjusting trimmer.

Figure 13:
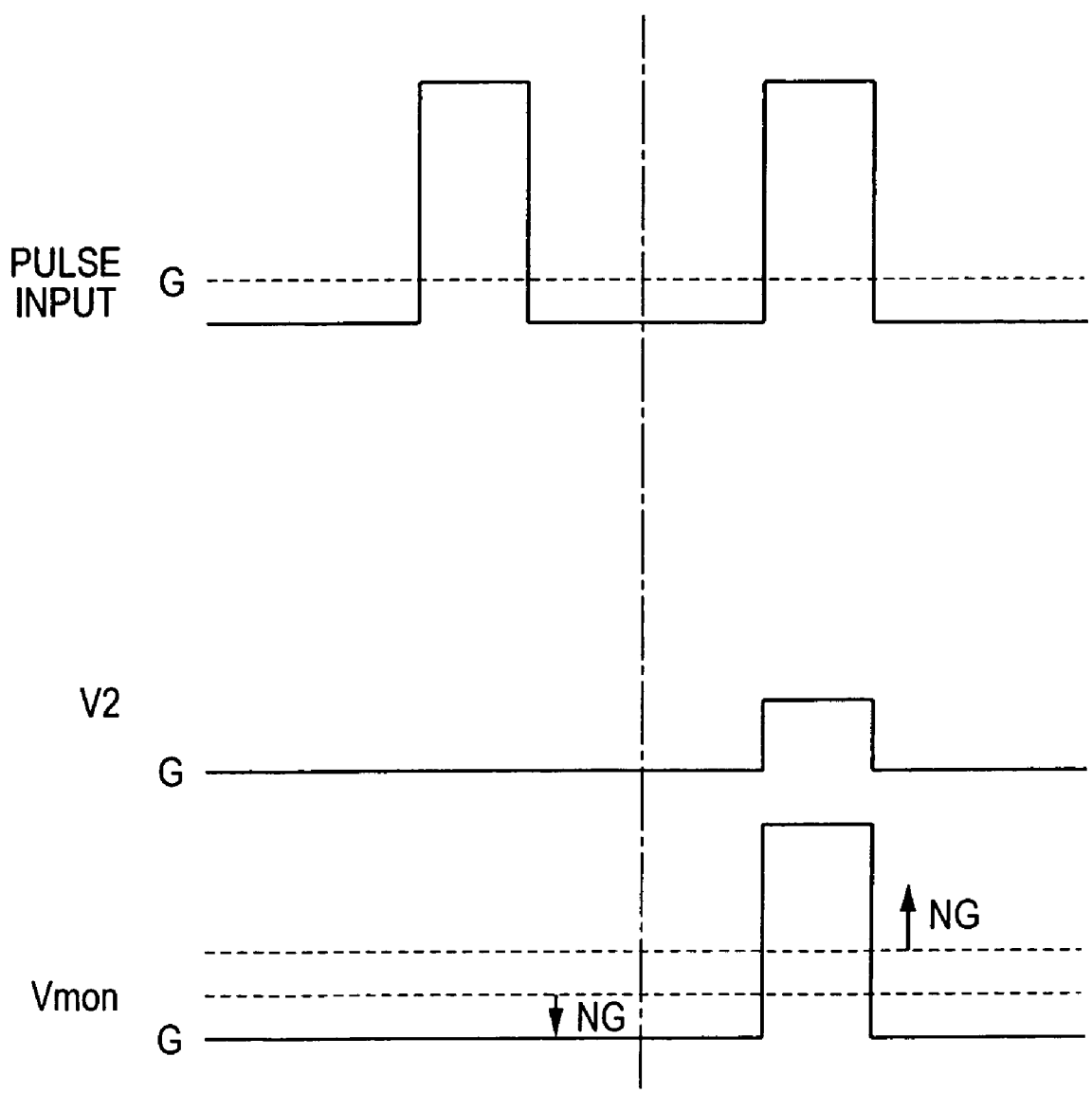
FIG. 13 is a graph showing waveform patterns of the pulse input, $V_2$, $V_{mon}$ when an abnormality occurs in elements except a power adjusting trimmer R6.

Meanwhile, FIG. 13 shows an operation when the abnormality occurs in elements except the power adjusting trimmer R6. For example, when the resistor R1 or R2 is opened or short-circuited, an amplitude of $V_1$ is changed and therefore $V_1$ is not shown in FIG. 13. In this case, the LD is turned OFF or emits the light excessively. As a result, the amplitude of $V_{mon}$ becomes larger or smaller than normal threshold values and thus the abnormality can be decided. As an example of abnormality that $V_{mon}$ is reduced below the normal threshold value, as shown in the left side of FIG. 13, open of the resistor R1, short of R2, open of R3, or the like is considered. Also, as an example of abnormality that $V_{mon}$ is increased higher than the normal threshold value, as shown in the right side of FIG. 13, open of R2, short between the collector-emitter of the transistor Q1, or the like is considered.

Figure 14:
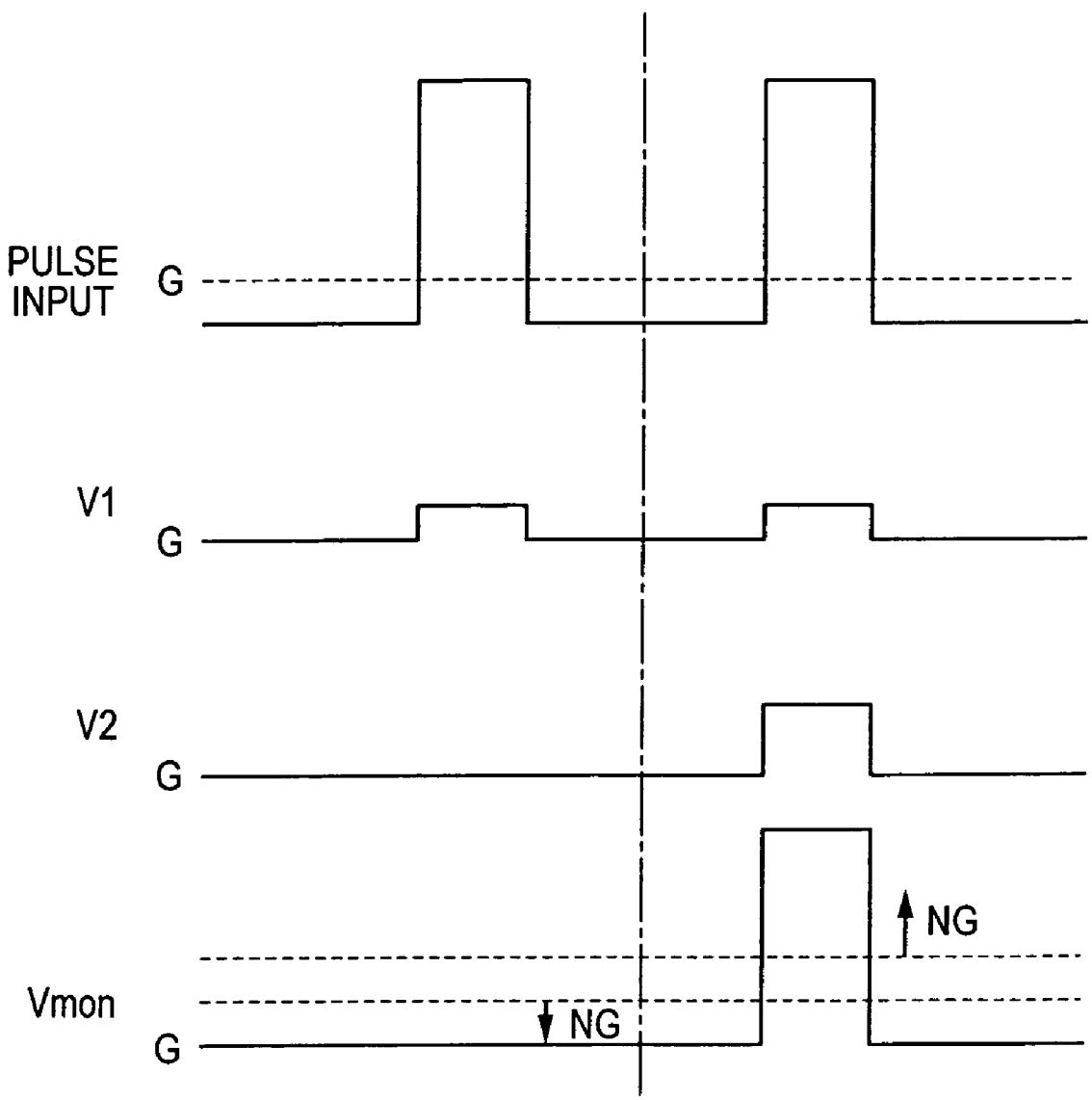
FIG. 14 is a graph showing waveform patterns of the pulse input, $V_1$, $V_2$, $V_{mon}$ when the abnormality occurs in the power adjusting trimmer R6 itself.

Then, FIG. 14 shows an operation when the abnormality occurs in the power adjusting trimmer R6 itself. For example, when R6 is opened, $V_1$ of 0.6 V is output because of the diode characteristic of the monitor PD, and a quantity of light of the LD is reduced, as shown in the right side of FIG. 14. Also, $V_{mon}$ exceeds the normal threshold value. Conversely, when R6 is short-circuited, $V_2$ becomes 0 V and the LD has the maximum output, as shown in the left side of FIG. 14. In this case, $V_{mon}$ is lower than the normal threshold value.

Figure 15:
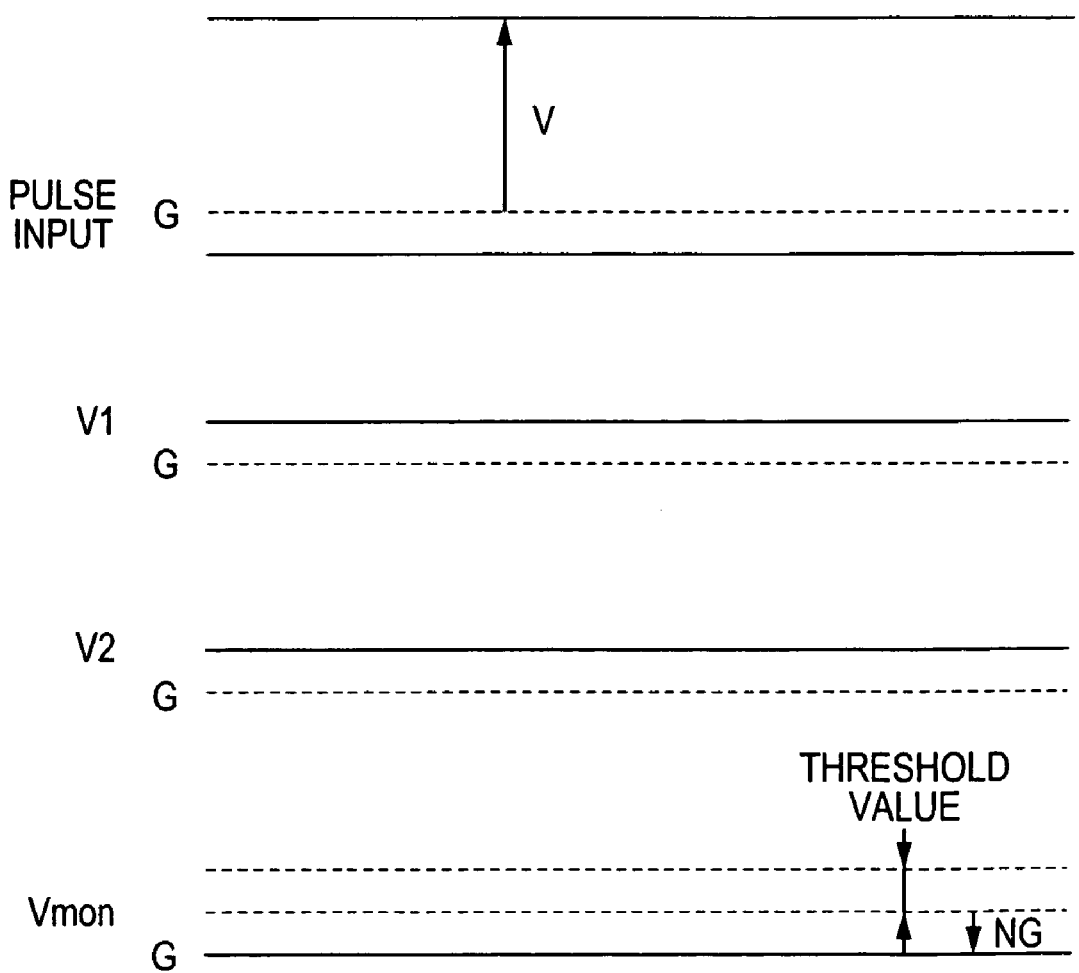
FIG. 15 is a graph showing waveform patterns of the pulse input, $V_1$, $V_2$, $V_{mon}$ when the pulse input becomes DC.

Then, FIG. 15 shows an operation when the pulse input becomes DC. When the pulse power supply becomes the DC power supply because of the failure, $V_{mon}$ is reduced to 0 V by the capacitor C2 acting as the DC lighting sensing circuit and thus $V_{mon}$ is lower than the normal threshold value.

The examples in which the abnormality of the projection head side is sensed on the controller side are explained as above. Also, such a configuration that a single failure of the controller can be sensed by the controller itself may be employed. For example, when Pin of the microcomputer constituting the controlling portion, or the like of the controller is short-circuited, the value being A/D-converted by the monitor signal sensing circuit 250 does not take a normal value and as a result the occurrence of the failure can be decided.

EXAMPLE 2

In above Example 1, the example in which one variable resistor is used is explained. Then, as Example 2 of the present invention, an example in which two variable resistors are used will be explained. In Example 2, in the circuit diagram in FIG. 7, the fixed resistance is used as the power adjusting trimmer R6 and the variable resistance is used instead of the fixed resistances R2 and R5. An abnormality sensing operation in this case is similar to that in Example 1. In Example 1, a variation of the monitor current of each LD module 468 of the projection head 400 is adjusted by the power adjusting trimmer R6 consisting of the variable resistance. In this case, since a delay of the LD light emission is also changed in response to the resistance value adjusted by R6, such a problem lies that a pulse width of the light emitted from the LD is also changed. On the contrary, in Example 2, the fixed resistance can be used as R6 because R2 and R6 are formed of the variable resistance. Thus, such an advantage can be achieved that a variation of the delay of the LD light emission due to a variation of the monitor current of the LD module can be improved. In the circuit in Example 2, since voltages of $V_1$, $V_2$ are changed following upon adjustment of the variable resistor R2 that is used to adjust the LD output, the monitor signal output $V_{mon}$ is not constant. Therefore, the monitor signal output $V_{mon}$ is adjusted at a predetermined voltage by adjusting a gain of the amplifier AMP2 by the variable resistor R5.

EXAMPLE 3

Also, as Example 3, the capacitor C2 acting as the DC lighting sensing circuit block can be omitted from the circuit in FIG. 7. In case the controller side has a processing speed to spare, a failure decision can be made by capturing the monitor signal when the pulse input is on the HIGH side and the LOW side, and as a result the DC lighting sensing circuit block can be omitted. As the deciding algorithm, in the normal operation, since the LD is not turned ON when the pulse power supply is on the LOW side, the monitor signal output $V_{mon}$ is 0 V. In contrast, in case the pulse power supply goes wrong and operates as the DC power supply, the LD is DC-turned ON and thus a predetermined voltage is output even when the pulse power supply is on the LOW side. The failure can be decided when this voltage is sensed, and then the pulse power supply can be shut off or limited. As described above, since the members provided to the projection head side can be reduced further when the DC lighting can be sensed on the controller side, Example 3 can contribute to a further reduction in size and cost of the projection head.

EXAMPLE 4

Figure 16:
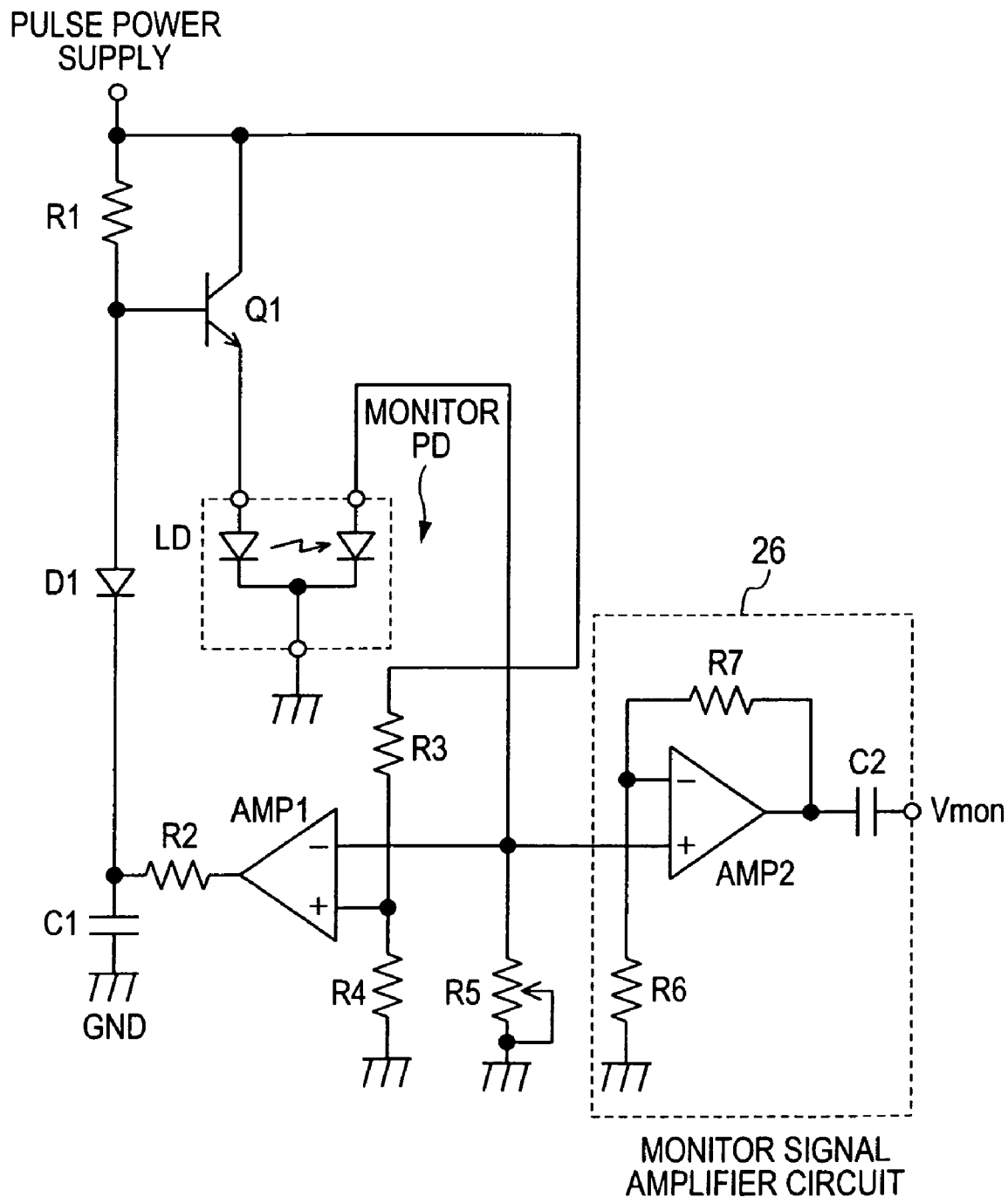
FIG. 16 is a block diagram showing an exemplary, non-limiting configuration of a projection head of a photoelectric sensor according to Example 4 of the present invention.

Also, as Example 4, an example of another circuit configuration of the exemplary, non-limiting projection head is shown in FIG. 16. The projection head shown in FIG. 16 has the pulse power supply input terminal for inputting the LD driving current, and the LD module in which the amplifier AMP1, the LD, and the monitor PD are built, and the transistor Q1 as the switching element. The transistor Q1 switches ON/OF timings at which the pulse current being input from the pulse power supply input terminal connected to the pulse input line is supplied to the light projecting device. Also, the variable resistor R5 constituting the power adjusting trimmer is provided as the monitor signal generating circuit. In addition, the pulse power supply input terminal is grounded via the resistor R1, the diode D1, and the capacitor C1 connected in series. A connection point between the capacitor C1 and the diode D1 is connected to the output side of the amplifier AMP1 via the resistor R2. Also, a voltage obtained by voltage-dividing the pulse power supply by the resistors R3, R4 is connected to the (+) side input of the amplifier AMP1, and a reference voltage of the amplifier AMP1 is generated by this divided voltage of the resistors R3, R4. Also, a base of the transistor Q1 is connected to a connection point between the resistor R1 and the diode D1. The collector side of the transistor Q1 is connected to the pulse power supply input terminal, and the emitted side is connected to the anode side of the LD. Also, the anode side of the monitor PD is grounded via the variable resistor R5. Accordingly, the variable resistor R5 generates the monitor voltage $V_{mon}$ based on the monitor current that responds to a quantity of received light of the monitor PD. Also, the monitor voltage $V_{mon}$ (monitor signal output terminal) as a connection point between the variable resistor R5 and the anode side of the monitor PD is connected to the (−) side input of the amplifier AMP1. Accordingly, the amplifier AMP1 can be turned ON/OFF by the monitor voltage $V_{mon}$. That is, the amplifier AMP1 is turned OFF when the monitor voltage $V_{mon}$ is less than the reference voltage, but the amplifier AMP1 is turned ON when the monitor voltage $V_{mon}$ is more than the reference voltage. The projection head receives the LD driving pulse input from the power controlling circuit 256 of the controller 200 at a timing defined by the timing controlling circuit 258, and drives the LD in answer to this input. Also, the projection head generates a predetermined monitor voltage adjusted by the power adjusting trimmer in response to a quantity of received light of the monitor PD, and sends back this voltage to the LD driving circuit side to execute the control.

Meanwhile, the projection head has the monitor signal amplifier circuit 26 that amplifies the monitor signal and sends out it to the controller side. The monitor signal amplifier circuit 26 is constructed by the amplifier AMP2, and the (+) side input of the amplifier AMP2 is connected to the variable resistor R5. Also, the output terminal side of the amplifier AMP2 is connected to the output terminal of the monitor voltage $V_{mon}$, i.e., the monitor signal output line via the capacitor C2. Also, the output side of the amplifier AMP2 is grounded via the resistors R7, R6, and a value voltage-divided by the resistors R7, R6 is input into the (−) side input of the amplifier AMP2. Accordingly, since a voltage output of the variable resistor R5 can be amplified and output by the amplifier AMP2, a noise resistance can be increased.

EXAMPLE 5

Figure 17:
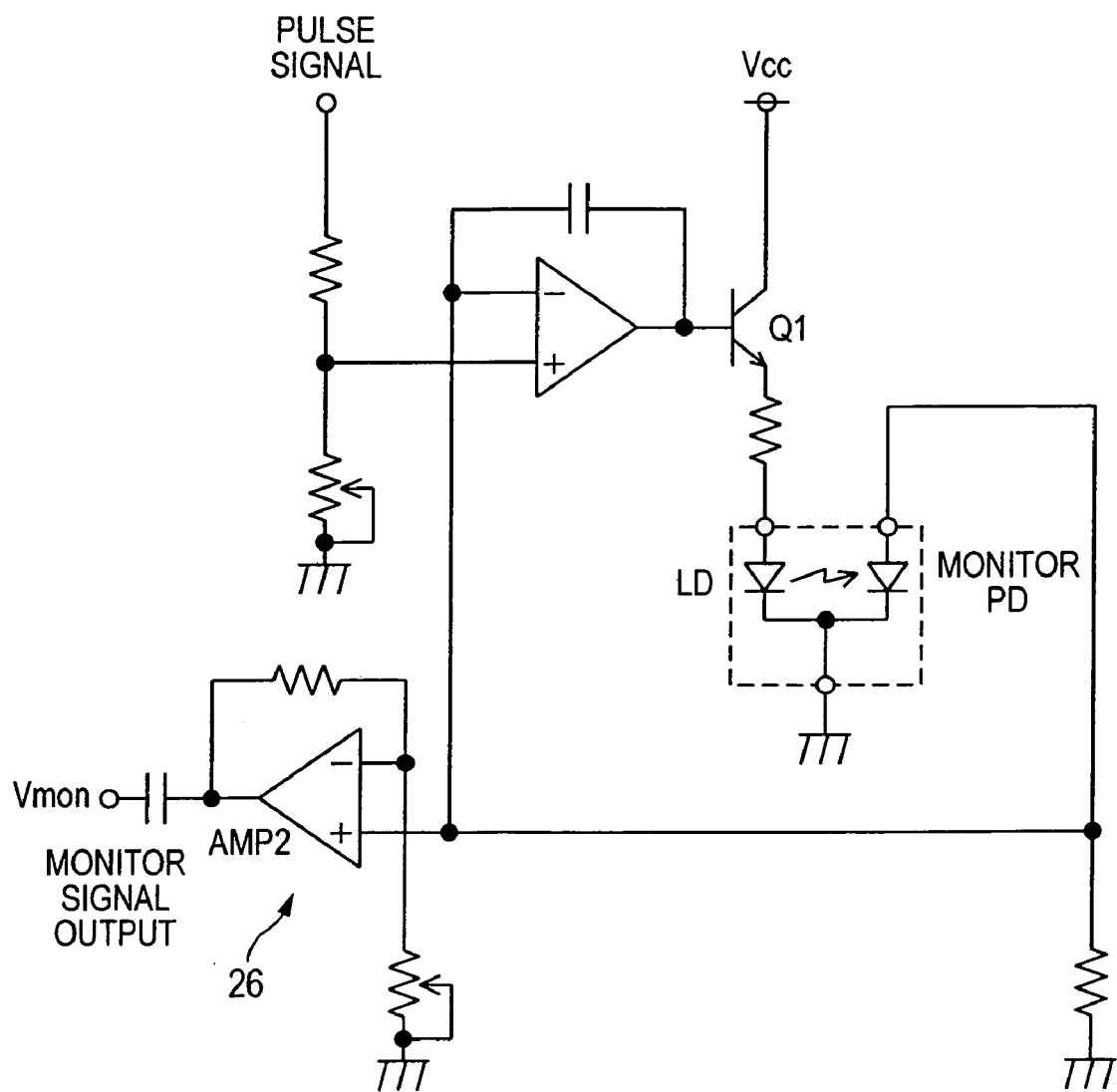
FIG. 17 is a block diagram showing an exemplary, non-limiting configuration of a projection head of a photoelectric sensor according to Example 5 of the present invention.

In above Examples, the example three lines of the pulse input line, the monitor signal output line, and the GND line are used as the signal line to connect the projection head and the controller, i.e., the signal line contained in the head cable is explained. Then, as Example 5, an example of a circuit configuration of the projection head in which four lines of the $V_{cc}$ line, the pulse input line, the monitor signal output line, and the GND line are provided as the head cable is shown in FIG. 17. The projection head shown in FIG. 17 gets a power for the LD driving power supply from the $V_{cc}$ line as the DC power supply. Like the above, this projection head also turns ON/OFF the transistor Q1 by the pulse current input from the pulse input line to drive the LD. Also, this projection head has the monitor signal amplifier circuit 26 that is constructed by the amplifier AMP2. An operational principle is substantially similar to above Example 4, and its detailed explanation will be omitted herein.

(Monitor Signal Initial Value Holding Function)

Also, the projection head may have a monitor signal initial value holding function of holding an initial value of the monitor signal obtained from the monitoring light receiving device. In order to deal with a variation of the monitor current, the projection head can change a setting of the threshold used to sense the abnormality in the projection head every projection head by storing an initial value (reference value) of the monitor current and then sending out the data to the controller side. Since normally the monitoring light receiving device such as the monitor PD, or the like has a large variation of the monitor current, a gain must be adjusted by the trimmer, or the like every projection head such that the monitor signal is kept constant against a reference amount of projected light. In contrast, in the present embodiment, the initial value of the monitor current is stored in the monitor signal initial value holding circuit 464 in the projection head. Therefore, the controller side can automatically adjust the setting to fit in with the connected projection head without troublesome operations such as the trimmer adjustment, and the like, and can sense adequately the abnormality.

EXAMPLE 6

Figure 18:
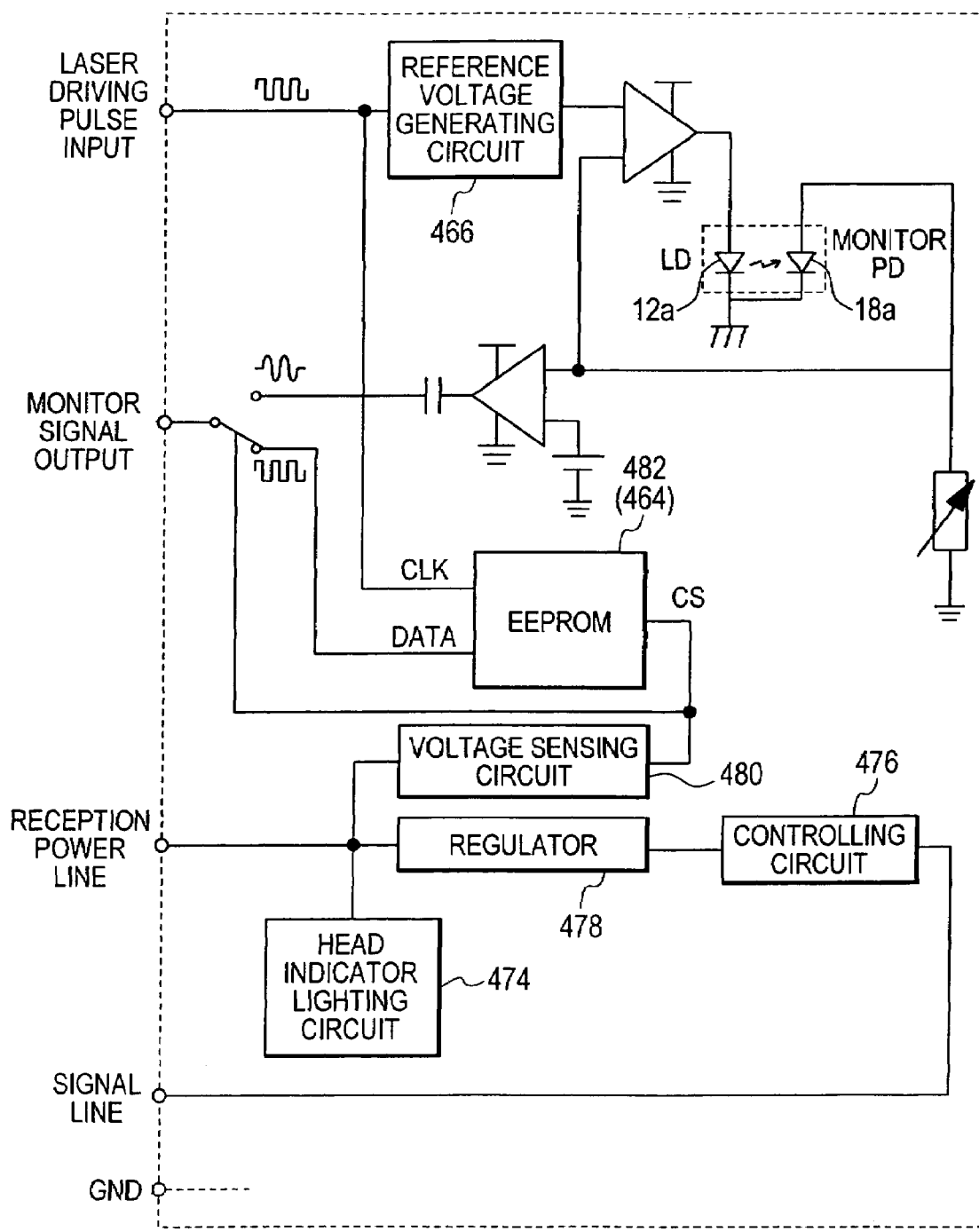
FIG. 18 is a block diagram showing an exemplary, non-limiting configuration of a projection head having a monitor signal initial value holding function of a photoelectric sensor according to Example 6 of the present invention.

Also, as Example 6, an example of a circuit of the projection head having the monitor signal initial value holding function is shown in FIG. 18. In this case, since the same members as the members explained in FIG. 6 are similar in FIG. 18, their detailed explanation will be omitted herein. The projection head shown in FIG. 18 gives the reflection type head that is integrated with the reception head. This reflection type head includes a head indicator lighting circuit 474 on the reception side, a controlling circuit 476, a regulator 478, a voltage sensing circuit 480, and an EEPROM 482. The head indicator lighting circuit 474 drives an indicator by a voltage that is received from the controller 200 side via a reception power line. The controlling circuit 476 executes various processes of the reception head and also sends out the reception signal to the controller side from a signal line. The regulator 478 converts a voltage of the reception power line into the driving voltage of the controlling circuit 476. The voltage sensing circuit 480 senses the voltage of the reception power line. The EEPROM 482 is one mode of the monitor signal initial value holding circuit 464 to hold the initial value of the monitor signal. The EEPROM 482 receives a driving pulse of the LD 12a as the light projecting device as a CLK signal, and switches the monitor signal output line to a DATA line by a CS line. The initial value of the monitor signal obtained by a monitor PD 18a is stored in this EEPROM 482, and can be read by a predetermined operation from the controller 200 side.

Normally the power supply voltage being output from the controller side to the reception head via the reception power line is the variable voltage obtained by adding the driving voltage of the controlling circuit 476 and the driving voltage of the head indicator lighting circuit 474. If one of the variable voltage levels is used as an internal operation switching control voltage to switch an operation mode of the reception head, the signal switching between the CS line and the monitor signal output line of the EEPROM 482 can be executed. More particularly, a variable voltage of the reception power line is chosen as the internal operation switching control voltage, then the switching of the operation mode in the reception head is sensed by the voltage sensing circuit 480, and then the operation mode of the reception head is switched to the operation mode in which the controller can access the EEPROM 482. Then, if the driving pulse of the LD 12*a* is input into the EEPROM 482 as the CLK signal, the initial value of the monitor current is output from the monitor signal output line as DATA. Accordingly, the controller 200 can acquire the initial value of the monitor current via the monitor signal output line of the connected reception head, and adjust the setting in response to this value. In this manner, if the initial value of the monitor current is stored on the projection head side to deal with a variation of the monitor current and such initial value is sensed on the controller 200 side, the threshold value used to sense the abnormality in the projection head can be set adequately every projection head. In this case, in the example in FIG. 18, the monitor signal output line is switched with the DATA line of the EEPROM 482. Alternately, the signal line on the reception side output from the controlling circuit 476 can be utilized in place of the monitor signal line and switched with the DATA line of the EEPROM 482.

EXAMPLE 7

Figure 19A:
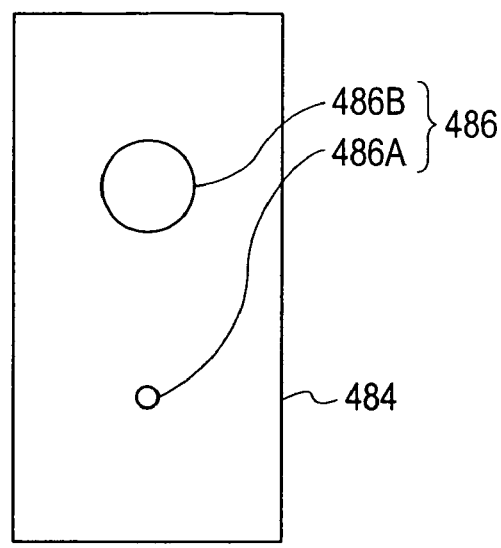
FIG. 19A is a plan view of a slit plate.
Figure 19B:
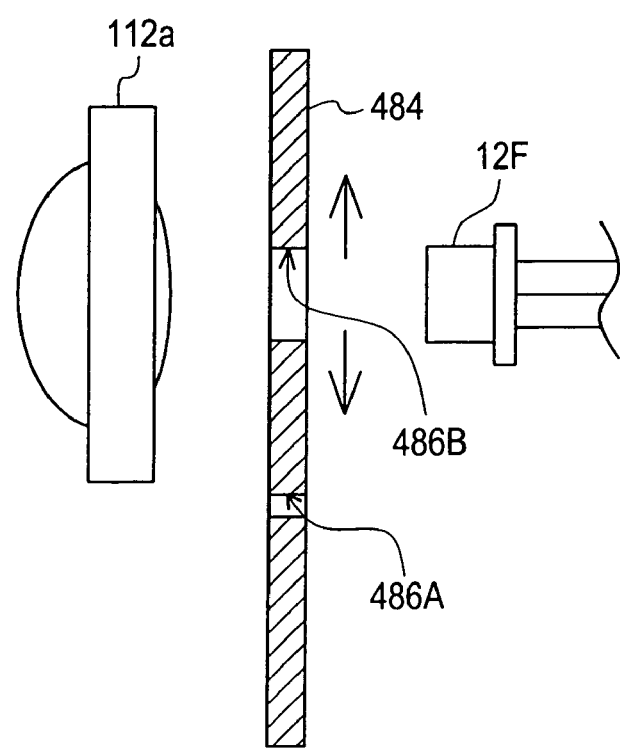
FIG. 19B is a sectional view showing a situation that the slit plate is arranged between a light emitting surface and a projection lens.
Figure 20A:
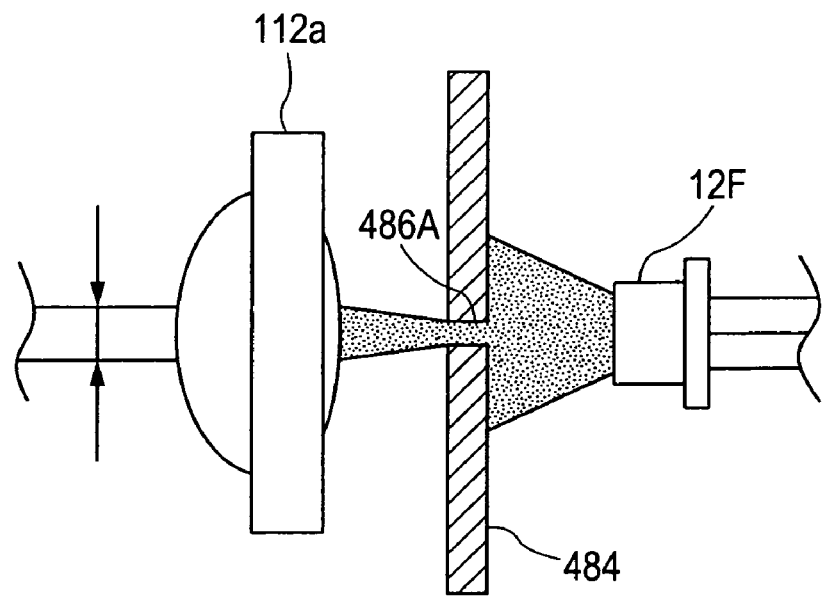
FIG. 20A shows a spot diameter of the light projecting device when an inner diameter of the slit hole is small.
Figure 20B:
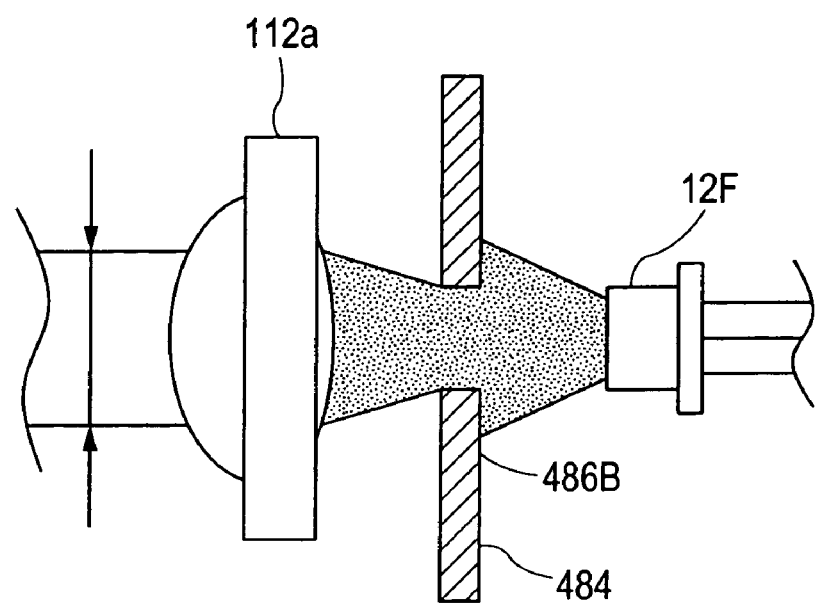
FIG. 20B shows a spot diameter of the light projecting device when the inner diameter of the slit hole is large.
Figure 21:
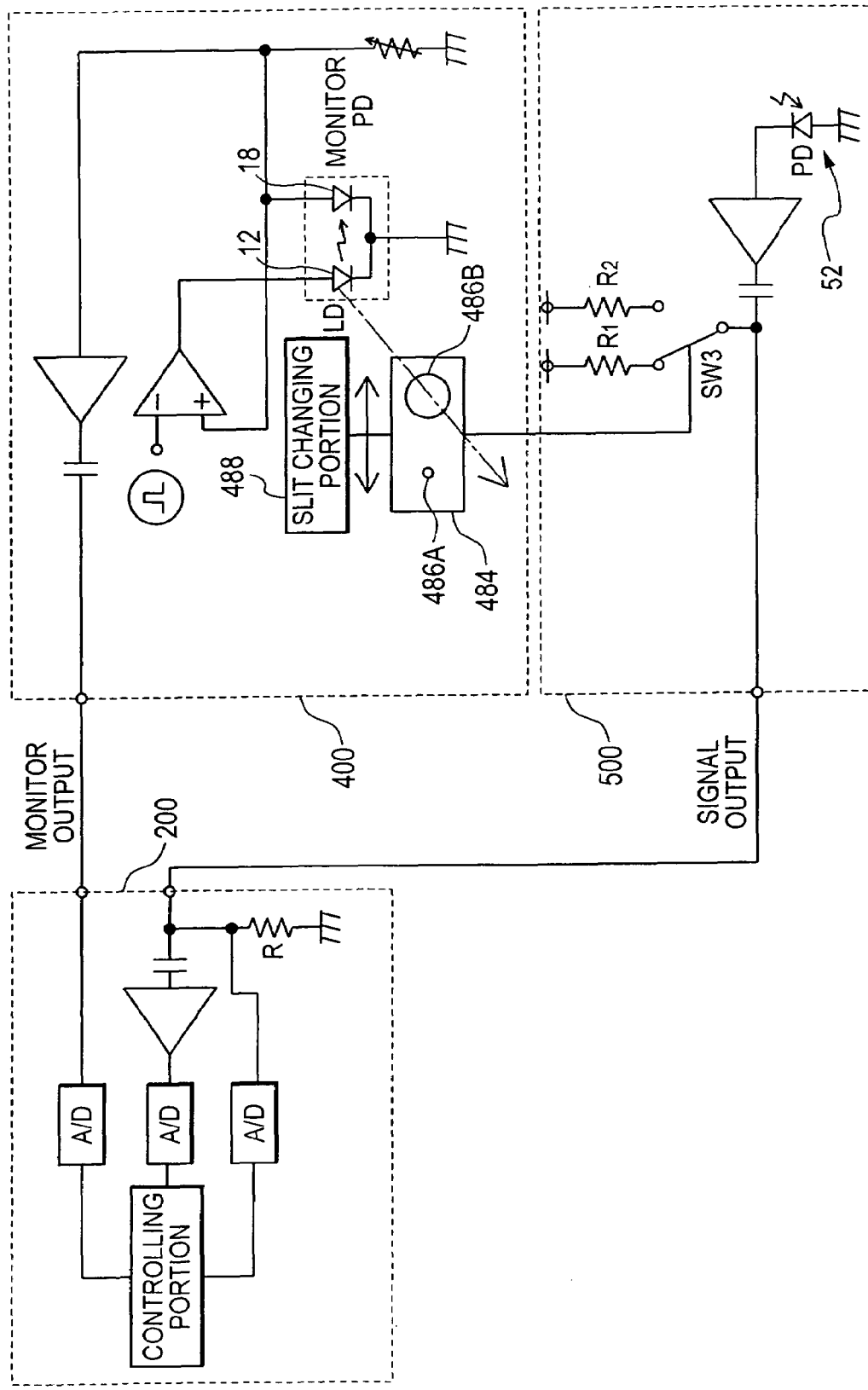
FIG. 21 is a circuit diagram showing an example of a circuit that senses a position of the slit plate on the controller side.

Then, a photoelectric sensor whose projection head has a slit plate will be explained with reference to FIG. 19 to FIG. 21 hereunder. FIG. 19 is a view showing a slit plate 484, wherein FIG. 19A is a plan view of the slit plate 484, and FIG. 19B is a sectional view showing a situation that the slit plate 484 is arranged between a light emitting surface of an LD 12F as the light emitting surface and a projection lens 112*a*. Also, FIG. 20 is a sectional view showing a situation that a slit hole 486 of the slit plate 484 is changed, wherein FIG. 20A shows a spot diameter of the LD 12F when an inner diameter of the slit hole 486A is small, and FIG. 20B shows a spot diameter of the light projecting device when the inner diameter of the slit hole 486B is large. FIG. 21 is a circuit diagram showing an example of a circuit that senses a position of such slit plate 484 on the controller side.

As shown FIG. 19A, the slit plate 484 is a plate member in which slit holes 486 having a different inner diameter respectively are formed in plural. As shown FIG. 19B, this slit plate 484 is arranged in front of the light emitting surface of the LD 12F as the light projecting device such that any of the slit holes 486 faces to the path along which the light is incident on a projection lens 112*a*. Accordingly, since the light is passed through the slit hole 486 when the projection head irradiates the light onto a sensing area, an irradiated spot diameter can be formed in response to the slit hole 486.

Also, the slit plate 484 is changed by a slit changing portion 488 such that mutual central axes of a plurality of slit holes 486 coincide with light emitting surface of the LD 12 respectively. In an example in FIG. 19B, the slit hole 486 is changed by moving the slit plate 484 vertically to slide.

When a small slit hole 486A is selected as shown in FIG. 20A, most of the light emitted from the LD 12F as the light projecting device are restricted by the slit hole 486A and therefore an irradiated spot diameter of the emitted light via the projection lens 112*a* can be narrowed. In contrast, when a large slit hole 486B is selected as shown in FIG. 20B, an amount of LD light restricted by the slit hole 486B is reduced and therefore an irradiated spot diameter of the emitted light can be enlarged. In this manner, a spot diameter of the light emitted from the LD 12F can be switched by changing the slit plate 484.

In the example in FIG. 19, two slot holes 486 having large and small diameters are provided. But it is needless to say that three slot holes or more can be provided. Also, in this example, the spot diameter is switched by moving the slit plate 484 shaped like a long and narrow slit to slide. But such a configuration can be employed that the spot diameter is switched by shaping the slit plate into a circular disk and then turning such slit plate like a turret. Otherwise, the slit plate a slit hole of which is changed continuously like an iris stop can be employed.

Since a quantity of light is reduced when a spot diameter is narrowed small, it is allowed by the standard to enhance the output of the LD correspondingly, which permits the higher precision sensing of a quantity of received light. However, in this case, since a quantity of emitted light is changed when the output of the LD is enhanced, a reference value (threshold value) of the monitor current used to sense a single failure is also changed. For this reason, when the slit plate is changed in the prior art, the threshold value of the monitor current must be set once again by the trimmer, or the like to fit in with the selected slit plate or slit hole, and thus it take much time and labor. Therefore, in the present embodiment, since a head identifying voltage is changed in response to the position of the slit plate and this value is sensed by the controller, the controller side can recognize the selected spot diameter and then can set the threshold value of the monitor current correspondingly. Also, the projection suppressing operation such as the projection stop or the projected light quantity restriction at a time of abnormality can be changed in response to the selected spot diameter. Otherwise, in addition to the operation setting at a time of abnormality, a timing of the driving pulse signal can be changed in response to the spot diameter or a driving current can be changed, for example, and then the monitor current is supplied to the projection head side. In this manner, for example, when plural types of projection heads are employed, the configuration for making it possible to automatically identify an inner condition of the projection head on the controller side can be used as the method of discriminating them. For example, when plural types of projection heads are connected mixedly to the controller, the controller can handle correctly the monitor current in reply to the characteristics of respective head portions by acquiring the head identifying signal and initial value data from respective projection heads and then referring to a look-up table prepared on the controller side.

An example of a circuit of the photoelectric sensor having the projection head identifying circuit 63 that senses the position of the slit plate 484 on the controller 200 side is shown in FIG. 21. In the photoelectric sensor shown in FIG. 21, the projection head 400 and the reception head 500 are connected to the controller 200. The projection head 400 has the light projecting device 12 and the monitoring light receiving device 18, the variable resistor for generating the monitor voltage, the projection amplifier for amplifying the monitor voltage as the monitor output, and the like. Here, since the similar configuration to the above configuration can be employed as the monitor signal output, and the like, their details are omitted from FIG. 21. Also, the reception head 500 has the light receiving device 52, the reception amplifier for amplifying a quantity of received light to generate the output signal, and the like. Further, the projection head 400 has the slit plate 484 that can move to slide, and the slit changing portion 488 for switching the slit hole 486 by moving the slit plate 484 to slide. In contrast, the reception head 500 has the resistors R1, R2 used to generate slit position information regarding the slit position of the slide plate, and the switch SW3 for switching the connection to these resistors R1, R2 to add selectively the voltage across the resistor R1 or R2 to the signal output. The switch SW3 and the slide plate are cooperated mechanically, and the switch SW3 switches the resistor when the slide plate is moved. Accordingly, since slide position information corresponding to the slide position is generated depending upon the resistance values of the resistors R1, R2, the controller 200 can recognize the type of the projection head and the slide position from the signal output on the controller 200 side, and can change the threshold value of the monitor current and the projection suppress command. In above Example 7, preferably the reflection type in which the projection head and the reception head are integrated should be employed. In the above configuration, the wiring used to control the switch SW3 is needed. However, in the integral type, since the wiring can be provided within the head, the number of signal lines to the controller side can be reduced and Example 7 can contribute to a simplification.

As described above, in the embodiments of the present invention, the head controller-separated type photoelectric switch using the laser is constructed such that only the monitor current of the LD is sensed in the head, then this current is amplified and fed to the controller side, then and the abnormality is sensed and decided on the controller side. As a result, a size reduction of the head can be achieved. The photoelectric switch of the present invention can be utilized preferably as the photoelectric sensor that senses whether or not the target is present on a production line in a factory, and the like, and is applicable to both transmission and reflection photoelectric sensors. In addition, the present invention is also applicable to the photoelectric sensor using the optical fiber.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

We claim:

1. A photoelectric switch, comprising:
   a projection head having a light projecting device for projecting a sensed light to a sensing area;
   a controller having a controlling portion provided separately from the projection head, for controlling a light projected from the light projecting device and executing a sensing operation based on sensing information of a light receiving device that receives a light from the sensing area of the light projecting device; and
   a head cable for connecting electrically the projection head and the controller;
   wherein the projection head includes
   a monitoring light receiving device for receiving a part of a light that the light projecting device emits, and
   a projected light quantity controlling device for executing a control such that a monitor signal obtained by the monitoring light receiving device is kept constant to maintain a quantity of projected light of the light projecting device at a predetermined value, and
   the controlling portion of the controller senses an abnormality of the projection head based on the monitor signal obtained from the monitoring light receiving device to be monitored via the head cable, and suppress the light projected from the light projecting device.

2. A photoelectric switch according to claim 1, wherein the projection head further includes
   a light projecting device driving circuit for driving the light projecting device, the monitoring light receiving device, and the projected light quantity controlling device, and
   a monitor signal generating circuit for generating the monitor signal based on a signal that is sensed by the monitoring light receiving device, and
   the controller further includes
   a monitor signal sensing circuit for sensing the monitor signal generated by the monitor signal generating circuit via the head cable,
   an abnormality deciding circuit for deciding the abnormality of the projection head based on information obtained by the monitor signal sensing circuit,
   a power controlling circuit for supplying a power to the projection head, and
   a timing controlling circuit for controlling a timing such that the power controlling circuit supplies a pulse power to the light projecting device driving circuit.

3. A photoelectric switch according to claim 2, wherein the monitoring light receiving device of the projection head includes a first monitoring light receiving device for receiving a part of the light emitted from the light projecting device and a second monitoring light receiving device for receiving another part of the light emitted from the light projecting device,
   the projected light quantity controlling device of the projection head senses the abnormality of the projection head based on a first monitor signal obtained from the first monitoring light receiving device and suppresses the light projected from the light projecting device, and
   the controlling portion of the controller senses the abnormality of the projection head based on a second monitor signal obtained from the second monitoring light receiving device to be monitored via the head cable, and suppresses the light projected from the light projecting device.

4. A photoelectric switch according to claim 3, wherein the projection head further includes a monitor signal initial value holding portion for holding an initial value of the monitor signal obtained from the monitoring light receiving device.

5. A photoelectric switch according to claim 3, wherein the projection head further includes a DC lighting sensing circuit for sensing a continuous lighting of the light projecting device to control the lighting of the light projecting device.

6. A photoelectric switch according to claim 3, wherein the head cable includes
   a power line for supplying a power to drive the light projecting device,
   a command line for instructing a projection and a suppression of the light projecting device, and
   a GND line.

7. A photoelectric switch according to claim 3, wherein the head cable includes
   a signal power line for sending out a power to drive the light projecting device at a timing at which the light projecting device projects the light, and
   a GND line.

8. A photoelectric switch according to claim 3, wherein the projection head further includes
   a slit plate which is arranged to face a light emitting surface of the light projecting device and in which a plurality of slit holes each having a different inner diameter are opened, and
   a slit switching portion for switching a position of the slit plate such that any one of a plurality of slit holes of the slit plate faces the light emitting surface of the light projecting device, whereby a spot diameter of the light projecting device is restricted in a desired size when the slit switching portion adjusts positions of the slit holes of the slit plate such that one of slit holes faces to the light emitting surface of the light projection device, and
   the controller is constructed to sense the position of the slit plate of the projection head.

9. A photoelectric switch according to claim 3, wherein the controller further includes an abnormality outputting portion for outputting an abnormality when the abnormality outputting portion senses the abnormality of the projection head.

10. A photoelectric switch according to claim 3, wherein the controlling portion of the controller controls the power controlling circuit to stop the light projected from the light projecting device when the controlling portion senses the abnormality of the projection head.

11. A photoelectric switch according to claim 3, further comprising:
   a reception head having the light receiving device.

12. A photoelectric switch according to claim 11, wherein the reception head is provided separately from the controller and integrated with the projection head.

13. A photoelectric switch according to claim 11, wherein the reception head is provided separately from the projection head and integrated with the controller.

14. A photoelectric switch according to claim 11, wherein the reception head is provided separately from the projection head and the controller.

15. A photoelectric switch according to claim 14, wherein the head cable includes
   a power line for supplying a power to drive the light projecting device,
   a command line for instructing a projection and a suppression of the light projecting device, and
   a GND line.

16. A photoelectric switch according to claim 14, wherein the head cable includes
   a signal power line for sending out a power to drive the light projecting device at a timing at which the light projecting device projects the light, and
   a GND line.

17. A photoelectric switch, comprising:
   a projection head having a semiconductor laser as a light projecting device that projects a sensed light toward a sensing area;
   a reception head having a light receiving device for receiving a light from the sensing area of the light projecting device;
   a controller having a controlling portion provided separately from the projection head, for controlling a light projected from the light projecting device and also executing a sensing operation based on a quantity of received light of the light receiving device; and
   a head cable for connecting electrically the projection head and the controller;
   wherein the projection head includes
   a monitoring light receiving device for receiving a part of a light that the light projecting device emits, and
   a projected light quantity controlling device for executing a control such that a monitor signal obtained by the monitoring light receiving device is kept constant to maintain a quantity of projected light of the light projecting device at a predetermined value, and
   the controlling portion of the controller senses an abnormality of the projection head based on the monitor signal obtained from the monitoring light receiving device to be monitored via the head cable, and stops the light projected from the light projecting device.

18. A photoelectric switch according to claim 14, wherein the reception head is provided separately from the controller and integrated with the projection head.

19. A photoelectric switch according to claim 14, wherein the reception head is provided separately from the projection head and integrated with the controller.

* * * * *

UNITED STATES PATENT AND TRADEMARK OFFICE
CERTIFICATE OF CORRECTION

PATENT NO. : 7,244,917 B2 Page 1 of 1
APPLICATION NO. : 11/362355
DATED : July 17, 2007
INVENTOR(S) : Tsukigi et al.

It is certified that error appears in the above-identified patent and that said Letters Patent is hereby corrected as shown below:

Claim 18, column 26, line 39, "claim 14," should read --claim 17,--

Claim 19, column 26, line 42, "claim 14," should read --claim 17,--

Signed and Sealed this

Sixth Day of November, 2007

JON W. DUDAS
*Director of the United States Patent and Trademark Office*